US012764793B2

(12) United States Patent
Ma et al.

(10) Patent No.: US 12,764,793 B2
(45) Date of Patent: Oct. 13, 2026

(54) DYNAMIC CONTROL OF SENSING DURATIONS

(71) Applicant: QUALCOMM Incorporated, San Diego, CA (US)

(72) Inventors: Ruifeng Ma, Beijing (CN); Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 18/042,450

(22) PCT Filed: Sep. 30, 2020

(86) PCT No.: PCT/CN2020/119373

§ 371 (c)(1),
(2) Date: Feb. 21, 2023

(87) PCT Pub. No.: WO2022/067655

PCT Pub. Date: Apr. 7, 2022

(65) Prior Publication Data

US 2023/0328792 A1 Oct. 12, 2023

(51) Int. Cl.
*H04W 74/0808* (2024.01)
*H04W 74/08* (2009.01)

(52) U.S. Cl.
CPC ... *H04W 74/0825* (2013.01); *H04W 74/0866* (2013.01)

(58) Field of Classification Search
None
See application file for complete search history.

(56) References Cited

U.S. PATENT DOCUMENTS

2018/0324619 A1 11/2018 Harada et al.
2019/0075597 A1 3/2019 Yerramalli et al.
(Continued)

FOREIGN PATENT DOCUMENTS

CN 111066373 4/2020
EP 3110200 A1 12/2016
(Continued)

OTHER PUBLICATIONS

International Search Report and Written Opinion—PCT/CN2020/119373—ISA/EPO—Jun. 30, 2021.
(Continued)

*Primary Examiner* — Saumit Shah
(74) *Attorney, Agent, or Firm* — Holland & Hart LLP

(57) ABSTRACT

Methods, systems, and devices for wireless communications are described. A UE may perform a wireless sensing procedure, such as radar sensing, based on a sensing pattern defining one or more sensing signal burst occasions. A base station may transmit signaling including a request to suspend the wireless sensing procedure based on a resource collision, or scheduling conflict, between the one or more sensing signal burst occasions used for the wireless sensing procedure and one or more resources used for communications between the UE and the base station. The UE may determine to suspend the wireless sensing procedure or reject the data transmission during the resources that collide. The UE may selectively continue the wireless sensing procedure or pause the wireless sensing procedure based on the determining.

30 Claims, 18 Drawing Sheets

(56) References Cited

U.S. PATENT DOCUMENTS

| | | | | |
|---|---|---|---|---|
| 2019/0313405 | A1* | 10/2019 | Li | H04W 72/542 |
| 2019/0335433 | A1 | 10/2019 | Oh et al. | |
| 2020/0072963 | A1 | 3/2020 | Yu et al. | |
| 2020/0077442 | A1 | 3/2020 | Tirucherai Muralidharan et al. | |
| 2020/0112964 | A1 | 4/2020 | Yang et al. | |
| 2020/0229102 | A1 | 7/2020 | Gubeskys et al. | |
| 2020/0305152 | A1* | 9/2020 | Yasukawa | H04W 92/18 |
| 2022/0312438 | A1* | 9/2022 | Yi | H04W 72/1263 |
| 2023/0023632 | A1* | 1/2023 | Aldana | H04W 72/12 |
| 2023/0066041 | A1* | 3/2023 | Guo | H04W 52/0216 |
| 2023/0086144 | A1* | 3/2023 | Roy | G01S 7/006 370/329 |

FOREIGN PATENT DOCUMENTS

| | | |
|---|---|---|
| WO | 2018134659 A1 | 7/2018 |
| WO | WO-2019046502 | 3/2019 |
| WO | 2020088744 A1 | 5/2020 |
| WO | 2020122617 A1 | 6/2020 |

OTHER PUBLICATIONS

ZTE, et al., "Mode 2 Resource Allocation Schemes on Sidelink", 3GPP TSG RAN WG1 #98bis, 3GPP Draft, R1-1910279 Mode 2 Resource Allocation Schemes on Sidelink, 3rd Generation Partnership Project (3GPP), Mobile Competence Centre, 650, Route Des Lucioles, F-06921 Sophia-Antipolis Cedex, vol. RAN WG1, No. Chongqing, China, Oct. 14, 2019-Oct. 20, 2019, Oct. 5, 2019 (Oct. 5, 2019), 8 Pages, XP051789084, paragraph [0006], the whole document.

ZTE: "Transmitter UE Behavior in V2V", 3GPP TSG-RAN WG1 Meeting #85, R1-164960, Nanjing, China, May 23, 2016-May 27, 2016, May 13, 2016, 7 pages.

NTT DOCOMO Inc: "UL HARQ Handling When P-HICH Collides with Measurement Gap", 3GPP TSG RAN WG2 #61bis, R2-081727, 3rd Generation Partnership Project, Mobile Competence Centre, 650, Route Des Lucioles, F-06921 Sophia-Antipolis Cedex, France, vol. RAN WG2, No. Shenzhen, China, Mar. 25, 2008, Mar. 25, 2008, 3 Pages, XP050139439, the whole document.

Supplementary European Search Report—EP20955680—Search Authority—Munich—May 8, 2024.

3GPP: "3rd Generation Partnership Project; Technical Specification Group Radio Access Network; NR; Medium Access Control (MAC) protocol specification (Release 15)", TS 38.321 V15.6.0, Jun. 2019, 77 Pages, Sections 5.4.3.1 (LCP), 5.7(DRX), 5.8 (SPS), 5.9(SCell Act./Deact.), 5.18(MAC CEs), 6.1.3.5,6.1.3.10.

* cited by examiner

DYNAMIC CONTROL OF SENSING DURATIONS

CROSS REFERENCE

The present Application is a 371 national stage filing of International PCT Application No. PCT/CN2020/119373 by Ma et al. entitled "DYNAMIC CONTROL OF SENSING DURATIONS," filed Sep. 30, 2020, which is assigned to the assignee hereof, and which is expressly incorporated by reference in its entirety herein.

TECHNICAL FIELD

The following relates to wireless communications, including dynamic control of sensing durations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic control of sensing durations. Generally, the described techniques provide for a base station to dynamically control a wireless sensing procedure at a user equipment (UE). A UE may perform a wireless sensing procedure, such as radar sensing, based on a sensing pattern defining one or more sensing signal burst occasions. In some cases, there may be a resource collision, or scheduling conflict, between the one or more sensing signal burst occasions used for the wireless sensing procedure and one or more resources used for communications between the UE and the base station. The base station may transmit signaling including a request to suspend the wireless sensing procedure during the resources that collide (e.g., during one or more sensing signal burst occasions). In some cases, the UE may determine whether to pause the wireless sensing procedure or reject the communications. (e.g., based on the priority of the wireless sensing procedure).

A method of wireless communications at a UE is described. The method may include performing a wireless sensing procedure based on a sensing pattern defining a set of sensing signal burst occasions, receiving, from a base station, signaling including a request to suspend the wireless sensing procedure based on a collision between one or more sensing signal burst occasions in the set of sensing signal burst occasions and a data transmission between the base station and the UE, determining to suspend the wireless sensing procedure for the one or more sensing signal burst occasions or to reject the data transmission for the one or more sensing signal burst occasions based on the signaling, and selectively continuing the wireless sensing procedure or pausing the wireless sensing procedure based on the determining.

An apparatus for wireless communications at a UE is described. The apparatus may include a processor, memory coupled with the processor, and instructions stored in the memory. The instructions may be executable by the processor to cause the apparatus to perform a wireless sensing procedure based on a sensing pattern defining a set of sensing signal burst occasions, receive, from a base station, signaling including a request to suspend the wireless sensing procedure based on a collision between one or more sensing signal burst occasions in the set of sensing signal burst occasions and a data transmission between the base station and the UE, determine to suspend the wireless sensing procedure for the one or more sensing signal burst occasions or to reject the data transmission for the one or more sensing signal burst occasions based on the signaling, and selectively continue the wireless sensing procedure or pause the wireless sensing procedure based on the determining.

Another apparatus for wireless communications at a UE is described. The apparatus may include means for performing a wireless sensing procedure based on a sensing pattern defining a set of sensing signal burst occasions, receiving, from a base station, signaling including a request to suspend the wireless sensing procedure based on a collision between one or more sensing signal burst occasions in the set of sensing signal burst occasions and a data transmission between the base station and the UE, determining to suspend the wireless sensing procedure for the one or more sensing signal burst occasions or to reject the data transmission for the one or more sensing signal burst occasions based on the signaling, and selectively continuing the wireless sensing procedure or pausing the wireless sensing procedure based on the determining.

A non-transitory computer-readable medium storing code for wireless communications at a UE is described. The code may include instructions executable by a processor to perform a wireless sensing procedure based on a sensing pattern defining a set of sensing signal burst occasions, receive, from a base station, signaling including a request to suspend the wireless sensing procedure based on a collision between one or more sensing signal burst occasions in the set of sensing signal burst occasions and a data transmission between the base station and the UE, determine to suspend the wireless sensing procedure for the one or more sensing signal burst occasions or to reject the data transmission for the one or more sensing signal burst occasions based on the signaling, and selectively continue the wireless sensing procedure or pause the wireless sensing procedure based on the determining.

In some examples of the method, apparatuses, and non-transitory computer-readable medium described herein, receiving the signaling further may include operations, features, means, or instructions for receiving an indication of a start time to suspend the wireless sensing procedure corresponding to the set of sensing signal burst occasions, and receiving an indication of an action to perform based on suspending the wireless sensing procedure.

Some examples of the method, apparatuses, and non-transitory computer-readable medium described herein may further include operations, features, means, or instructions for switching from a sensing mode to a data transmission mode based on the indication of the action to perform.

Some examples of the method, apparatuses, and non-transitory computer-readable medium described herein may further include operations, features, means, or instructions for receiving a configuration for the data transmission based on the indication of the action to perform.

In some examples of the method, apparatuses, and non-transitory computer-readable medium described herein, selectively pausing the wireless sensing procedure may include operations, features, means, or instructions for communicating with the base station during a time period corresponding to the one or more sensing signal burst occasions, and resuming, after the time period, performing the wireless sensing procedure based on the sensing pattern.

Some examples of the method, apparatuses, and non-transitory computer-readable medium described herein may further include operations, features, means, or instructions for receiving, from the base station, second signaling including a request to resume performing the wireless sensing procedure, and resuming performing the wireless sensing procedure based on the request to resume performing the wireless sensing procedure.

In some examples of the method, apparatuses, and non-transitory computer-readable medium described herein, receiving the signaling further may include operations, features, means, or instructions for receiving an indication of a time duration during which the UE may be to suspend the wireless sensing procedure.

In some examples of the method, apparatuses, and non-transitory computer-readable medium described herein, receiving the signaling further may include operations, features, means, or instructions for receiving an indication of a pattern of one or more resources during which the UE may be to suspend the wireless sensing procedure.

Some examples of the method, apparatuses, and non-transitory computer-readable medium described herein may further include operations, features, means, or instructions for receiving, from the base station, an indication of a silent sensing resource index for each of the one or more resources.

Some examples of the method, apparatuses, and non-transitory computer-readable medium described herein may further include operations, features, means, or instructions for receiving, from the base station, one or more of: a downlink control information (DCI) block including the indication, a medium access control-control element (MAC-CE) including the indication, or both.

In some examples of the method, apparatuses, and non-transitory computer-readable medium described herein, selectively continuing the wireless sensing procedure may include operations, features, means, or instructions for performing the wireless sensing procedure during a time period corresponding to the one or more sensing signal burst occasions.

Some examples of the method, apparatuses, and non-transitory computer-readable medium described herein may further include operations, features, means, or instructions for transmitting, to the base station, an indication of the determination to reject the data transmission for the one or more sensing signal burst occasions, and receiving second control signaling including scheduling information for the data transmission outside of the one or more sensing signal burst occasions.

Some examples of the method, apparatuses, and non-transitory computer-readable medium described herein may further include operations, features, means, or instructions for transmitting, to the base station, an indication of one or more available resources for the data transmission, where the scheduling information for the data transmission outside of the one or more sensing signal burst occasions may be based on the indication of the one or more available resources for the data transmission.

Some examples of the method, apparatuses, and non-transitory computer-readable medium described herein may further include operations, features, means, or instructions for receiving, from the base station and after a time period, second signaling including a second request to suspend the wireless sensing procedure.

In some examples of the method, apparatuses, and non-transitory computer-readable medium described herein, receiving the signaling further may include operations, features, means, or instructions for receiving the request in a DCI block, a MAC-CE, or both.

A method of wireless communications at a base station is described. The method may include transmitting, to a UE, signaling including a request to suspend a wireless sensing procedure based on a collision between one or more sensing signal burst occasions in a set of sensing signal burst occasions and a data transmission between the base station and the UE, determining whether the UE has suspended the wireless sensing procedure based on the signaling, and communicating with the UE based on the determination.

An apparatus for wireless communications at a base station is described. The apparatus may include a processor, memory coupled with the processor, and instructions stored in the memory. The instructions may be executable by the processor to cause the apparatus to transmit, to a UE, signaling including a request to suspend a wireless sensing procedure based on a collision between one or more sensing signal burst occasions in a set of sensing signal burst occasions and a data transmission between the base station and the UE, determine whether the UE has suspended the wireless sensing procedure based on the signaling, and communicate with the UE based on the determination.

Another apparatus for wireless communications at a base station is described. The apparatus may include means for transmitting, to a UE, signaling including a request to suspend a wireless sensing procedure based on a collision between one or more sensing signal burst occasions in a set of sensing signal burst occasions and a data transmission between the base station and the UE, determining whether the UE has suspended the wireless sensing procedure based on the signaling, and communicating with the UE based on the determination.

A non-transitory computer-readable medium storing code for wireless communications at a base station is described. The code may include instructions executable by a processor to transmit, to a UE, signaling including a request to suspend a wireless sensing procedure based on a collision between one or more sensing signal burst occasions in a set of sensing signal burst occasions and a data transmission between the base station and the UE, determine whether the UE has suspended the wireless sensing procedure based on the signaling, and communicate with the UE based on the determination.

In some examples of the method, apparatuses, and non-transitory computer-readable medium described herein, transmitting the signaling further may include operations, features, means, or instructions for transmitting an indication of a start time to suspend the wireless sensing procedure corresponding to the set of sensing signal burst occasions, and transmitting an indication of an action to perform based on suspending the wireless sensing procedure.

Some examples of the method, apparatuses, and non-transitory computer-readable medium described herein may further include operations, features, means, or instructions for transmitting a configuration for the data transmission based on the indication of the action to perform.

Some examples of the method, apparatuses, and non-transitory computer-readable medium described herein may further include operations, features, means, or instructions for communicating with the UE during a time period corresponding to the one or more sensing signal burst occasions.

Some examples of the method, apparatuses, and non-transitory computer-readable medium described herein may further include operations, features, means, or instructions for transmitting, to the UE, second signaling including a request to resume performing the wireless sensing procedure.

In some examples of the method, apparatuses, and non-transitory computer-readable medium described herein, transmitting the signaling further may include operations, features, means, or instructions for transmitting an indication of a time duration during which the UE may be to suspend the wireless sensing procedure.

In some examples of the method, apparatuses, and non-transitory computer-readable medium described herein, transmitting the signaling further may include operations, features, means, or instructions for transmitting an indication of a pattern of one or more resources during which the UE may be to suspend the wireless sensing procedure.

Some examples of the method, apparatuses, and non-transitory computer-readable medium described herein may further include operations, features, means, or instructions for transmitting, to the UE, an indication of a silent sensing resource index for each of the one or more resources.

Some examples of the method, apparatuses, and non-transitory computer-readable medium described herein may further include operations, features, means, or instructions for transmitting, to the UE, one or more of: a DCI block including the indication, a MAC-CE including the indication, or both.

In some examples of the method, apparatuses, and non-transitory computer-readable medium described herein, determining whether the UE may have suspended the wireless sensing procedure may include operations, features, means, or instructions for determining whether the UE may be performing the wireless sensing procedure during a time period corresponding to the one or more sensing signal burst occasions.

Some examples of the method, apparatuses, and non-transitory computer-readable medium described herein may further include operations, features, means, or instructions for receiving, from the UE, an indication of the determination to reject the data transmission for the one or more sensing signal burst occasions, and transmitting second control signaling including scheduling information for the data transmission outside of the one or more sensing signal burst occasions.

Some examples of the method, apparatuses, and non-transitory computer-readable medium described herein may further include operations, features, means, or instructions for receiving, from the UE, an indication of one or more available resources for the data transmission, where the scheduling information for the data transmission outside of the one or more sensing signal burst occasions may be based on the indication of the one or more available resources for the data transmission.

Some examples of the method, apparatuses, and non-transitory computer-readable medium described herein may further include operations, features, means, or instructions for transmitting, to the UE and after a time period, second signaling including a second request to suspend the wireless sensing procedure.

In some examples of the method, apparatuses, and non-transitory computer-readable medium described herein, transmitting the signaling further may include operations, features, means, or instructions for transmitting the request in a DCI block, a MAC-CE, or both.

DETAILED DESCRIPTION

Figure 1:
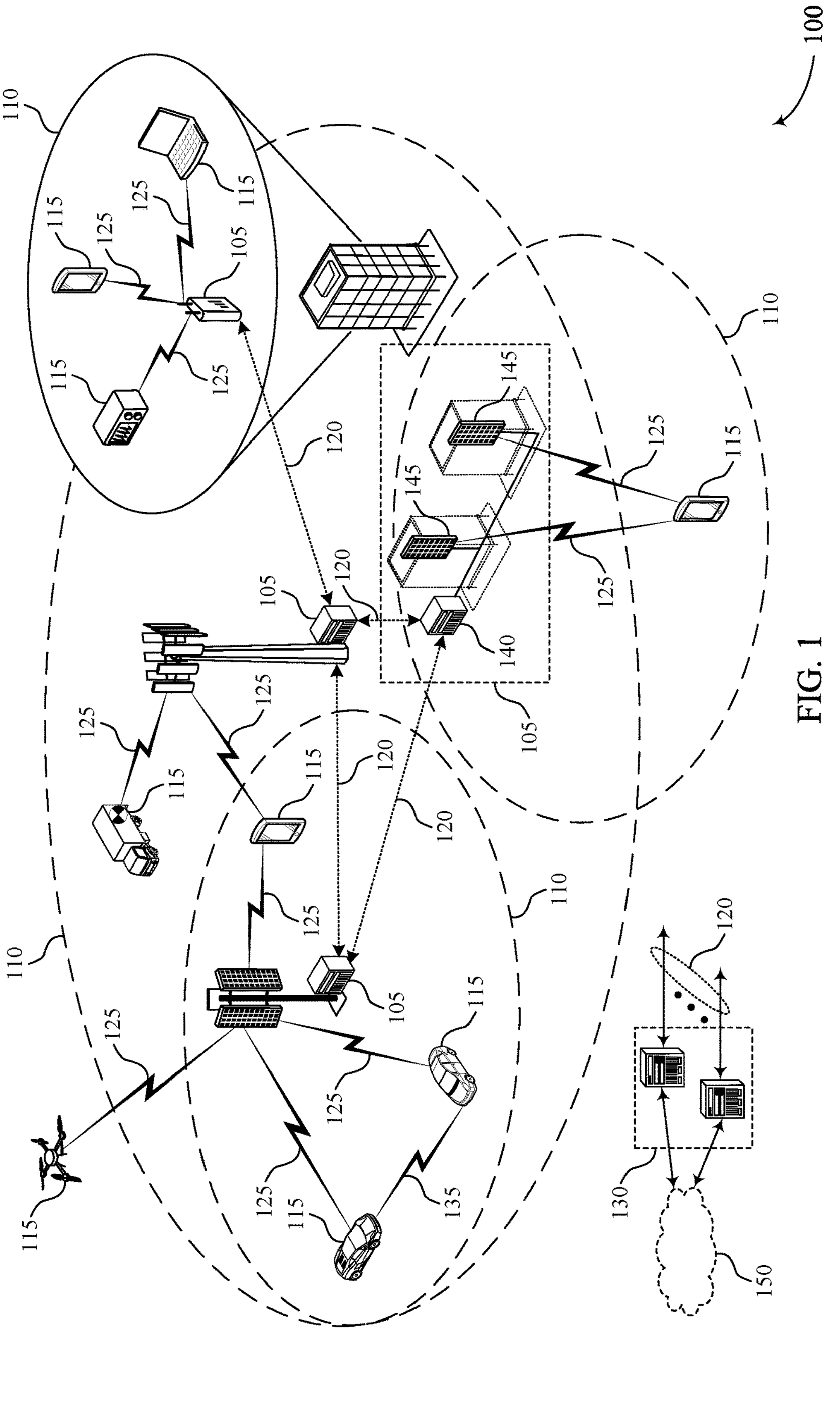
FIGS. 1 and 2 illustrate examples of wireless communications systems that support dynamic control of sensing durations in accordance with aspects of the present disclosure.

In some examples, a user equipment (UE) may perform wireless sensing, such as radar sensing in a millimeter wave (mmW) environment. The radar sensing may extract range information, velocity information, angle information, or the like for environmental imaging in a compact form (e.g., with relatively high bandwidth and large aperture). For example, a wearable device or a vehicle may use a radar sensor for gesture classification or control, respectively. In some cases, the UE may perform the wireless sensing according to a pattern that includes one or more sensing signal burst occasions. The pattern, which may be periodic, semi-persistent, or aperiodic, may be signaled to the UE in control signaling from a base station (e.g., radio resource control (RRC) signaling, downlink control information (DCI), a medium access control-control element (MAC-CE), or the like). In some cases, there may be different use cases for performing the wireless sensing, such as security, detection of an intruder, healthcare, or beam selection and wireless connection optimization. Different use cases may have different priorities and use different sensing resources, such as sensing signal burst occasions. If the UE performs the wireless sensing during one or more sensing signal burst occasions while attempting to transmit or receive a data transmission, there may be a resource collision between the sensing signal burst occasions and the data signal, which may cause interference and high signaling overhead due to retransmissions at the UE.

As described herein, a base station may transmit control signaling to the UE to suspend a wireless sensing procedure, such as radar sensing. The control signaling may indicate when to suspend the wireless sensing procedure and a following action for the UE to perform while the wireless sensing procedure is suspended (e.g., transmit data or control signaling, receive data or control signaling, or a combination). The UE may determine to suspend the wireless sensing procedure during one or more sensing signal burst occasions or may reject a data transmission during the sensing signal burst occasions. For example, the UE may pause the wireless sensing procedure during a time period (e.g., during the sensing signal burst occasions) based on receiving the control signaling. The base station may transmit a request to the UE to resume the wireless sensing procedure after the time period. In some other examples, the UE may continue the wireless sensing procedure during the time period based on a priority of the sensing type. That is, if the UE is performing a high priority sensing operation, the UE may determine not to pause the wireless sensing procedure during the time period and may report collision information back to the base station. The UE may transmit feedback information based on determining to pause the wireless sensing procedure or continue the wireless sensing procedure.

Aspects of the disclosure are initially described in the context of wireless communications systems. Aspects of the disclosure are further described in the context of a timeline and process flows. Aspects of the disclosure are further illustrated by and described with reference to apparatus diagrams, system diagrams, and flowcharts that relate to dynamic control of sensing durations.

FIG. 1 illustrates an example of a wireless communications system 100 that supports dynamic control of sensing durations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), or mMTC (massive MTC), and NB-IoT may include eNB-IoT (enhanced NB-IoT), or FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may perform a wireless sensing procedure, such as a radar sensing procedure. For example, a handheld or short range radar device or sensor may be implemented at a UE 115. In some cases, the UE 115 may be a smart phone or a smart watch (e.g., a wearable device) that includes a radar sensor for gesture classification. In some other cases, the UE 115 may be a vehicle with a radar device capable of short range wireless sensing for in-car-based control. In some cases, the UE 115 may perform the wireless sensing procedure during a sensing pattern that specifies one or more sensing signal burst occasions. The sensing pattern may be configured (e.g., by a base station 105) at the UE 115 to time multiplex one or more sensing signal burst occasions. In some examples, different use cases for the wireless sensing procedure may have different priorities. For example, the UE 115 may perform the wireless sensing procedure for security applications, detection of an intruder, health care applications, or beam selection and wireless connection optimization. Each application may have a different level of importance with an associated priority level. In some cases, one or more sensing signal burst occasions for the wireless sensing procedure may overlap with resources used for communications between the UE 115 and the base station 105. In some examples, there may be a resource collision between the sensing signal burst occasions and the communication resources, which may cause interference and high signaling overhead due to retransmissions at the UE 115.

In some examples, a base station 105 may dynamically control a wireless sensing procedure at a UE 115. For example, if there is a resource collision, or scheduling conflict, between a wireless sensing procedure and communications between the UE 115 and the base station 105, the base station 105 may transmit signaling including a request to suspend the wireless sensing procedure during the resources that collide (e.g., during one or more sensing signal burst occasions). In some cases, the signaling may include an indication of when the UE 115 is to pause the wireless sensing procedure, an indication of the following actions to perform after pausing the wireless sensing procedure, or both. In some cases, the UE 115 may determine whether to pause the wireless sensing procedure or reject the communications (e.g., reject transmission or reception of data or control signaling) based on the priority of the wireless sensing procedure. For example, the UE 115 may determine to pause the wireless sensing procedure based on receiving signaling including the request to suspend the wireless sensing procedure if the wireless sensing procedure has a relatively low priority application. However, in some cases, the sensing may be high priority (e.g., controlling a vehicle, surveillance, or the like), in which case the UE 115 may determine to reject the communications and may continue the wireless sensing procedure. If the UE 115 continues the wireless sensing procedure, the UE 115 may report the collision information back to the base station 105 in a feedback message. The base station 105 may reschedule the communications based on the UE 115 continuing the wireless sensing procedure.

Figure 2:
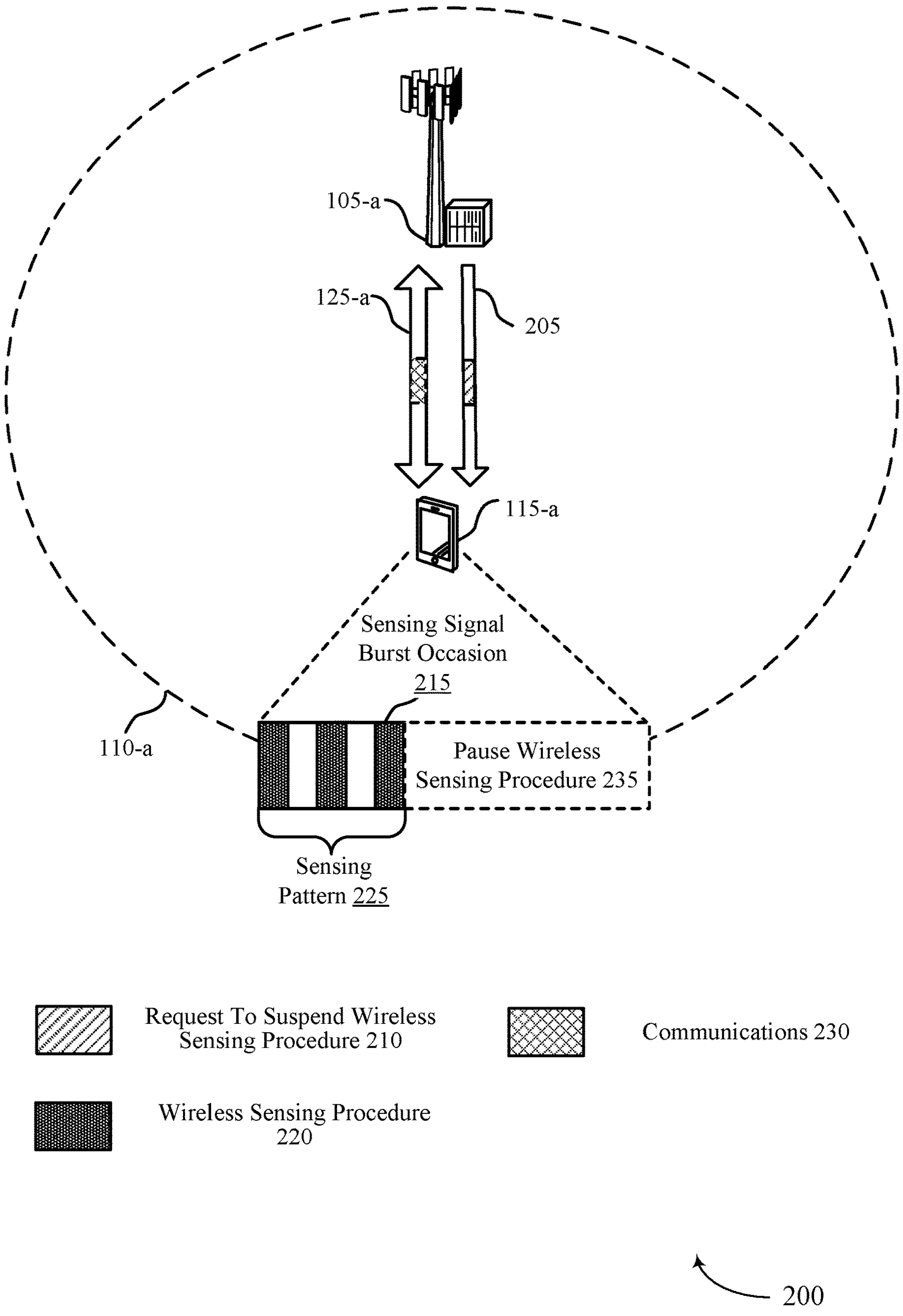

FIG. 2 illustrates an example of a wireless communications system 200 that supports dynamic control of sensing durations in accordance with aspects of the present disclosure. In some examples, wireless communications system 200 may implement aspects of wireless communications system 100 and may include UE 115-*a*, base station 105-*a* with coverage area 110-*a*, and communication link 125-*a*, which may be examples of a UE 115, a base station 105 with a coverage area 110, and a communication link 125 as described with reference to FIG. 1. In some examples, base station 105-*a* may communicate control signaling with a UE 115, such as UE 115-*a*, using a downlink communication link 205. The control signaling may include a request to suspend a wireless sensing procedure 210 for one or more sensing signal burst occasions 215.

In some cases, a UE 115, such as UE 115-*a*, may perform a wireless sensing procedure 220. The wireless sensing procedure 220 may be a radar sensing procedure using mmW radar (e.g., sub-6 GHz bands). In some cases, the mmW radar may have a relatively high bandwidth and large aperture to extract accurate range information, velocity information, angle information or the like, which may provide the UE with environmental imaging of the surroundings. In some cases, the mmW radar may provide environmental features in a compact form, which may allow a mobile device to perform the wireless sensing procedure 220. For example, a handheld or short range radar device or sensor may be employed at a UE 115. In some cases, the UE 115 may be a smart phone or a smart watch (e.g., a wearable device) that includes a radar sensor for gesture classification. In some other cases, the UE 115 may be a vehicle with a radar device capable of short range wireless sensing for in-car-based control. In some examples, the radar device or radar sensor may use waveform technology in which a sensing chip sends the radar signals with pre-defined waveforms (e.g., frequency modulated continuous-wave (FMCW) or pulse waveforms). The radar device or radar sensor may perform radar signal processing (RSP), where reflected received signals are correlated with transmitted signals to determine the range information, velocity information (e.g., which may be used to calculate to Doppler frequency), angle information, or the like. Additionally or alternatively, the radar device or radar sensor may use a machine learning algorithm (e.g., classification, regression, an artificial intelligence agent, or a combination) to deduce information from the output of the wireless sensing procedure 220.

In some cases, the UE 115 may perform the wireless sensing procedure 220 during a sensing pattern 225 that specifies one or more sensing signal burst occasions 215. For example, the UE 115 may perform a periodic, semi-persistent, or aperiodic wireless sensing procedure 220 during one or more sensing signal burst occasions 215 based on the sensing pattern 225. The sensing pattern 225 may be configured (e.g., by a base station 105) at the UE 115 to time multiplex one or more sensing signal burst occasions 215. In some examples, each sensing signal burst occasion 215 duration may be 250 micro seconds (μs) (e.g., two slots for a subcarrier spacing (SCS) of 120 kilohertz (kHz)) or 10 milliseconds (ms) with a 2 ms offset for periodic or semi-persistent wireless sensing procedures 220. In some cases, within a burst, there may be discrete symbols for sensing a signal transmission (e.g., either FMCW or pulse with a pulse duration of 272 nanoseconds (ns) and a pulse periodicity of 10 μs). In some cases, such as for low power consumption scenarios, the sensing pattern 225 may have a lower density of sensing signal burst occasions 215 (e.g., to image an environment for a portion of time). In some other cases, the sensing pattern 225 may have a higher density of sensing signal burst occasions 215.

In some examples, different use cases for the wireless sensing procedure 220 may have different priorities. For example, the UE 115 may perform the wireless sensing procedure 220 for security applications, detection of an intruder, health care applications, or beam selection and wireless connection optimization Each application may have a different level of importance with an associated priority level. For example, a wireless sensing procedure 220 (e.g., for radio frequency surveillance) may have a higher priority than another wireless sensing procedure 220 or other signals, such as vital signal monitoring that has a lower priority (e.g., temporal disruption may be acceptable). In some cases, a UE 115 may be configured with different sensing resources for different wireless sensing procedures 220 or other purposes. A sensing resource configuration may be switched between sensing applications. For example, when a surveillance related wireless sensing procedure 220 is triggered, a wireless sensing procedure 220 with a low density sensing pattern 225 may be switched to a high density sensing pattern 225 (e.g., with more sensing signal burst occasions 215).

In some cases, one or more sensing signal burst occasions 215 for the wireless sensing procedure 220 may overlap with one or more resources for communications between the UE 115 and the base station 105 (e.g., resources used for transmitting or receiving data or control signaling). Configured sensing resources (e.g., the sensing signal burst occasions 215) may be multiplexed with downlink or uplink data or control signaling between the base station 105 and the UE 115. Thus, a resource collision between the sensing resources, such as the sensing signal burst occasions 215, and the resources used for the channel and signal transmission or reception (e.g., time-frequency resources) may occur, which may cause interference and high signaling overhead due to retransmissions at the UE 115.

In some examples, a base station, such as base station 105-*a*, may dynamically control a wireless sensing procedure 220 at a UE 115. For example, if there is a resource collision, or scheduling conflict, between a wireless sensing procedure 220 and communications 230 between UE 115-*a* and base station 105-*a* (e.g., time-frequency resources used for communications 230 overlap with one or more sensing signal burst occasions 215), base station 105-*a* may transmit signaling including a request to suspend the wireless sensing procedure 210 during the resources that collide (e.g., during one or more sensing signal burst occasions 215). In some cases, base station 105-*a* may transmit the request to suspend the wireless sensing procedure 210 to UE 115-*a* using DCI in a downlink control channel (e.g., a physical downlink control channel (PDCCH)), a MAC-CE, or the like.

In some cases, the signaling may include an indication of when UE 115-*a* is to pause (e.g., stop) the wireless sensing procedure 220, an indication of the following actions to perform after pausing the wireless sensing procedure at 235, or both. In some examples, UE 115-*a* may switch from a sensing mode to a data transmission mode, receive another configuration for the communications 230, or both based on the indication of the action to perform. In some examples, the signaling may include an indication of a sensing silent period. For example, the indication of the sensing silent period may be a duration UE 115-*a* is to pause the wireless sensing procedure at 235. In some cases, UE 115-*a* may pause the wireless sensing procedure at 235 based on the duration or the indication of when UE 115-*a* is to pause the wireless sensing procedure at 235. UE 115-*a* may communicate with base station 105-*a* based on pausing the wireless sensing procedure at 235 (e.g., may transmit or receive data or control signaling during the resources that collide). UE 115-*a* may resume the wireless sensing procedure 220 after the duration. Additionally or alternatively, UE 115-*a* may receive dynamic control signaling from base station 105-*a* indicating to UE 115-*a* to resume the wireless sensing procedure 220. The dynamic control signaling may be indicated in DCI in a downlink control channel (e.g., a PDCCH), a MAC-CE, or the like.

In some cases, the signaling may include an indication of a sensing pattern 225 that includes one or more silent sensing resources indices. For example, base station 105-*a* may transmit an explicit indication of the silent sensing resource indices in which UE 115-*a* is to pause the wireless sensing procedure 220. The explicit indication may include a bitmap of 1s and 0s in which a sensing resource with an index pointing to a 1 means the UE 115-*a* is to pause the wireless sensing procedure 220 during that sensing resource (e.g., for a sensing signal burst occasion 215). In some other examples, the silent sensing resources may be predefined, or higher layer configured, for candidate bitmap entries. The control signaling (e.g., a DCI block, a MAC-CE, or the like) may indicate the index for the silent sensing resources in the predefined bitmap entry for UE 115-*a*.

UE 115-*a* may determine whether to pause the wireless sensing procedure at 235 or reject the communications 230 (e.g., reject transmission or reception of data or control signaling) based on the priority of the wireless sensing procedure 220. For example, UE 115-*a* may determine to pause the wireless sensing procedure at 235 based on receiving signaling including the request to suspend the wireless sensing procedure 210 if the wireless sensing procedure 220 has a relatively low priority application. However, in some cases, the sensing may be high priority (e.g., controlling a vehicle, surveillance, or the like), in which case UE 115-*a* may determine to reject the communications 230 and may continue the wireless sensing procedure 220. If UE 115-*a* continues the wireless sensing procedure 220, UE 115-*a* may report the collision information back to base station 105-*a* in a feedback message. For example, UE 115-*a* may include an indication that the resources for communications 230 may be used to continue the wireless sensing procedure 220 rather than to transmit or receive data or control signaling. In some examples, UE 115-*a* may indicate one or more available resources (e.g., time resources) for rescheduling the communications 230. For example, UE 115-*a* may know the duration of the wireless sensing procedure 220 and may transmit an indication including the duration to base station 105-*a*. Base station 105-*a* may reschedule the communications 230 based on UE 115-*a* continuing the wireless sensing procedure 220, based on the indication including the duration of the wireless sensing procedure 220 (e.g., an indication of available resources), or both.

In some cases, if UE 115-*a* does not feedback information to base station 105-*a*, base station 105-*a* may wait for a time period, then retransmit a request to suspend the wireless sensing procedure 210. UE 115-*a* may determine to pause (e.g., suspend) the wireless sensing procedure at 235 or continue the wireless sensing procedure 220 based on the retransmitted request.

Figure 3:
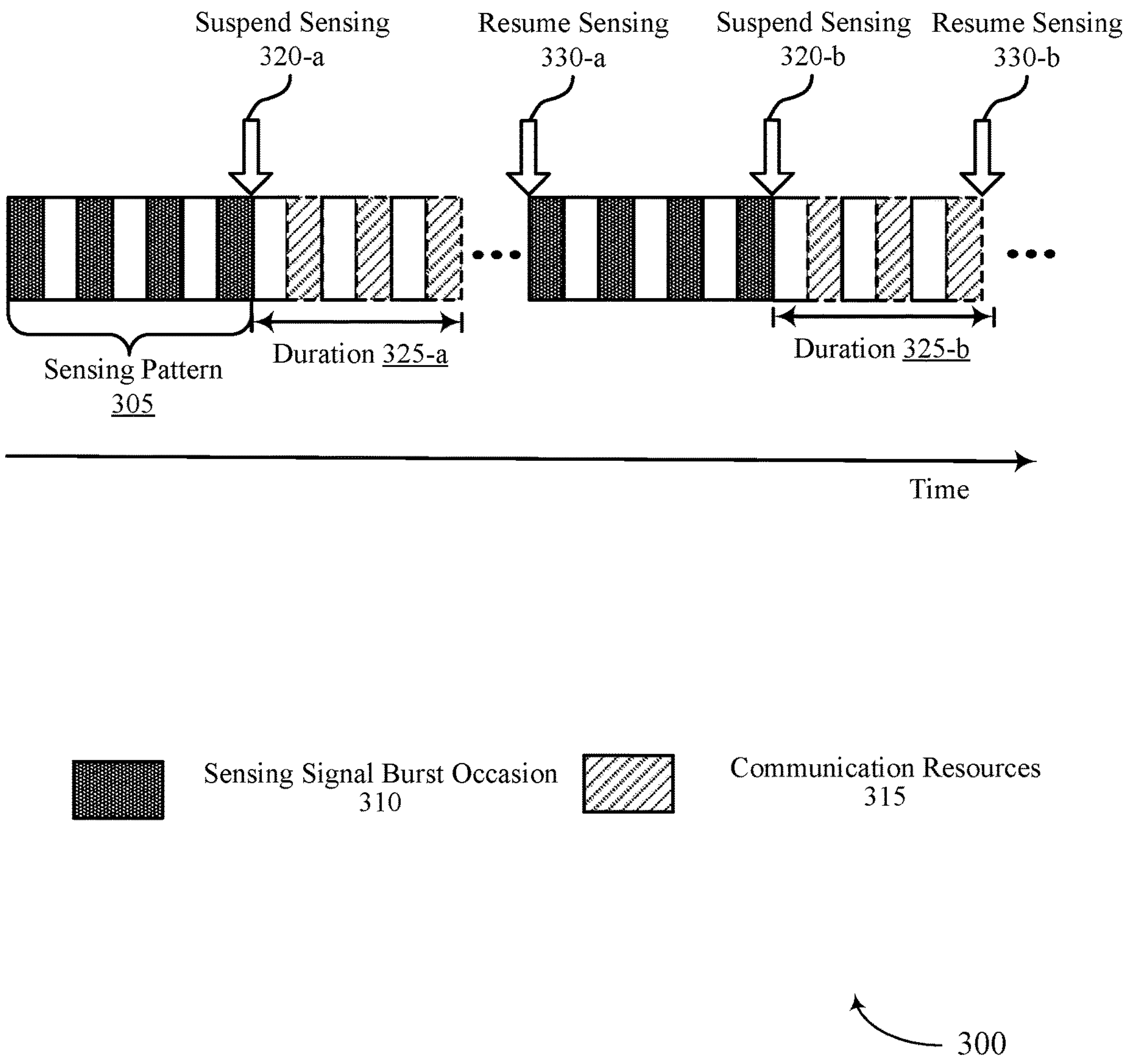
FIG. 3 illustrates an example of a timeline that supports dynamic control of sensing durations in accordance with aspects of the present disclosure.

FIG. 3 illustrates an example of a timeline 300 that supports dynamic control of sensing durations in accordance with aspects of the present disclosure. In some examples, timeline 300 may implement aspects of wireless communication system 100, wireless communications system 200, or both. Timeline 300 may be implemented by a UE 115 in a wireless sensing procedure, as described with reference to FIGS. 1 and 2. For example, a base station 105 may communicate control signaling with a UE 115 including a request to suspend a wireless sensing procedure for one or more sensing signal burst occasions. In some examples, the UE 115 may selectively pause or continue the wireless sensing procedure.

In some cases, a UE 115 may perform a wireless sensing procedure according to a sensing pattern 305. For example, the UE 115 may perform wireless sensing, such as radar sensing, during one or more sensing signal burst occasions 310 based on the sensing pattern 305. In some cases, the sensing pattern may be indicated to the UE 115 via control signaling (e.g., DCI, RRC signaling, a MAC-CE, or the like). In some examples, the resources for the wireless sensing procedure (e.g., the sensing signal burst occasions 310) may be multiplexed with one or more communication resources 315 for communicating with a base station 105 (e.g., transmitting or receiving data or control signaling). The sensing signal burst occasions 310 may overlap, or collide, with the communication resources 315, which may cause interference and high signaling overhead due to retransmissions at the UE 115.

In some cases, a base station 105 may transmit control signaling including a request to suspend sensing at 320-*a*. The request may include an indication of the duration 325-*a* the UE 115 is to suspend the wireless sensing operation, an indication of when to pause the wireless sensing procedure, an indication of the action to perform after pausing the wireless sensing procedure, or a combination. In some examples, the UE 115 may determine to pause the wireless sensing procedure or to continue the wireless sensing procedure based on the priority level of the wireless sensing procedure. For example, if the priority of the wireless sensing procedure is relatively low, the UE 115 may pause the wireless sensing procedure to perform the action indicated in the control signaling (e.g., switch to a data transmission mode, receive another configuration for data transmission or reception, or the like).

In some cases, the UE 115 may resume sensing at 330-*a*. For example, the UE 115 may resume the wireless sensing procedure based on the indication of the duration 325-*a*, based on receiving dynamic signaling indicating to the UE 115 to resume the wireless sensing procedure, or both. The base station 105 may transmit the dynamic signaling to the UE 115 via DCI in a downlink control channel (e.g., a PDCCH), a MAC-CE, or the like. The UE 115 may continue to perform the wireless sensing operation during one or more sensing signal burst occasions based on the sensing pattern 305. In some cases, the base station 105 may configure the UE 115 with a pattern for pausing the wireless sensing procedure. For example, UE 115 may suspend sensing at 320-*b* based on the pattern for pausing the wireless sensing procedure. The pattern may include the duration 325 for pausing the wireless sensing procedure (e.g., duration 325-*a*, duration 325-*b*, or both), and an index list for pausing the sensing (e.g., an indication of when to pause the wireless sensing procedure). The UE 115 may resume sensing at 330-*b* based on the duration 325-*b*, based on receiving dynamic signaling including a request to resume sensing, or both. The UE 115 may continue to perform the wireless sensing procedure based on the sensing pattern 305 and the pattern for pausing the wireless sensing procedure until otherwise indicated by the base station 105 or as indicated in the pattern for pausing the wireless sensing procedure.

In some other examples, if the priority of the wireless sensing procedure is relatively high, the UE 115 may continue the wireless sensing procedure. The UE 115 may transmit a feedback message to the base station 105 indicating a rejection of a data transmission or reception. The UE 115 may determine one or more available resources (e.g., based on the duration of the wireless sensing procedure) and may transmit an indication of the available resources to the base station 105. The base station 105 may reschedule the data transmission or reception at the UE 115, for example, based on the available resources.

In some cases, the base station 105 may not receive a feedback message from the UE 115 based on the control signaling (e.g., the UE 115 may not receive the control signaling indicating the request to suspend sensing at 320-*a*). The base station 105 may transmit an additional request to suspend sensing at 320-*b* based on not receiving a feedback message from the UE 115. The UE 115 may suspend sensing at 320-*b* for a duration 325-*b* based on receiving the request. In some cases, the UE 115 may receive a request to resume sensing at 330-*b* from the base station 105. Additionally or alternatively, the UE 115 may determine to resume the wireless sensing procedure based on an indication of the duration in control signaling.

Figure 4:
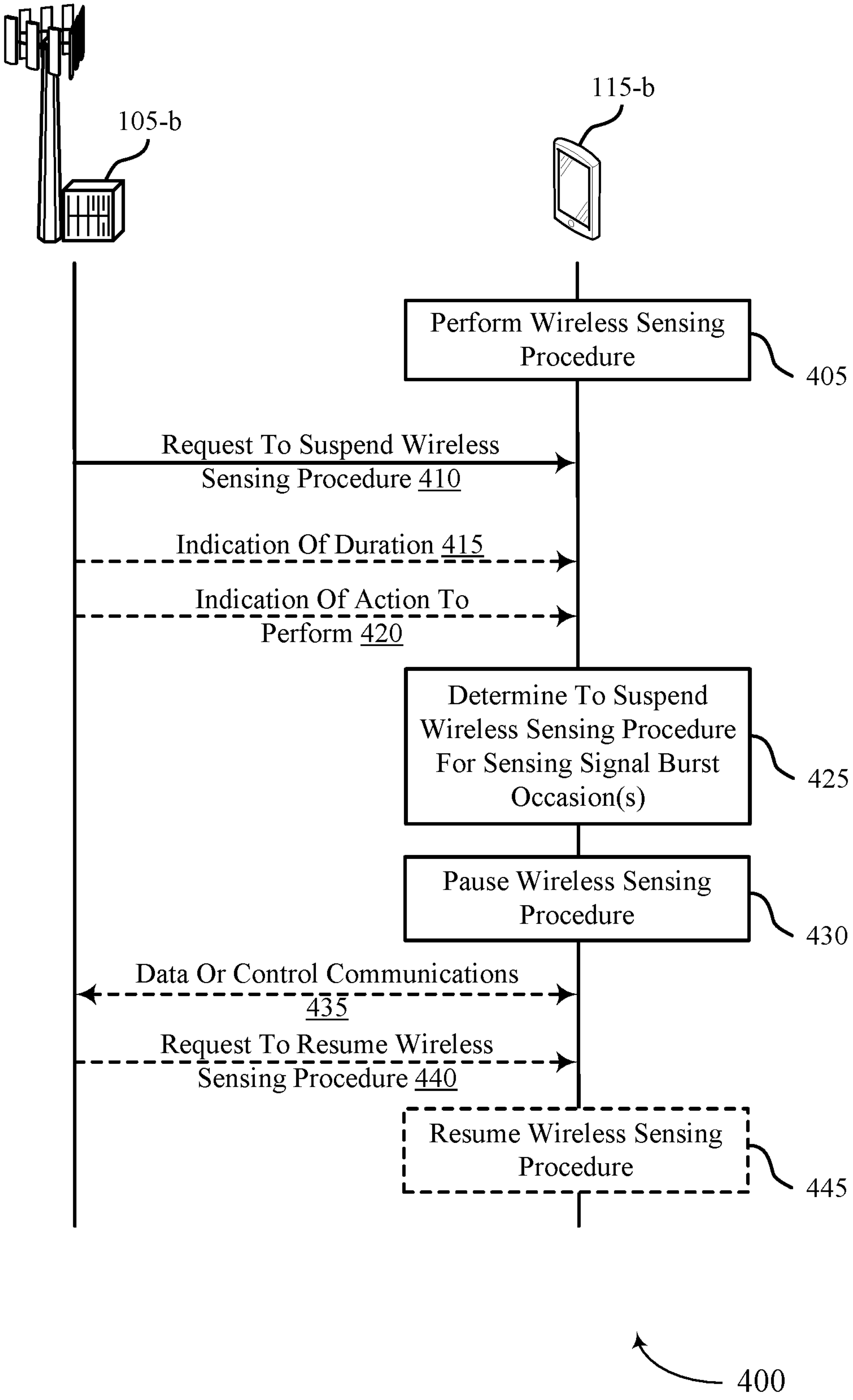
FIGS. 4 and 5 illustrate examples of process flows that support dynamic control of sensing durations in accordance with aspects of the present disclosure.

FIG. 4 illustrates an example of a process flow 400 that supports dynamic control of sensing durations in accordance with aspects of the present disclosure. In some examples, process flow 400 may implement aspects of wireless communication system 100, wireless communications system 200, timeline 300, or a combination. The process flow 400 may illustrate an example of a base station 105, such as base station 105-*b*, communicating control signaling with a UE 115, such as UE 115-*b*, including a request to suspend a wireless sensing procedure for one or more sensing signal burst occasions. In some examples, UE 115-*b* may selectively pause the wireless sensing procedure based on the control signaling. Alternative examples of the following may be implemented, where some processes are performed in a different order than described or are not performed. In some cases, processes may include additional features not mentioned below, or further processes may be added.

At 405, UE 115-*b* may perform a wireless sensing procedure, such as radar sensing, based on a sensing pattern defining one or more sensing signal burst occasions. UE 115-*b* may perform the wireless sensing procedure during the one or more sensing signal burst occasions. In some cases, the sensing pattern may be periodic, semi-persistent, aperiodic, or a combination.

At 410, UE 115-*b* may receive signaling from base station 105-*b* (e.g., a DCI block, a MAC-CE, or both) including a request to suspend the wireless sensing procedure based on a collision between the one or more sensing signal burst occasions and resources, such as time resources, for transmission or reception of data or control signaling between base station 105-*b* and UE 115-*b*. In some cases, the signaling may include a pattern of one or more resources during which UE 115-*b* is to suspend the wireless sensing procedure. For example, UE 115-*b* may receive an indication of a silent sensing resource index for each of the one or more resources (e.g., in a DCI block, a MAC-CE, or both).

At 415, UE 115-*b* may receive an indication of a duration to suspend the wireless sensing procedure. For example, UE 115-*b* may receive an indication of a start time to suspend the wireless sensing procedure (e.g., from bases station 105-*b* in the control signaling).

At 420, UE 115-*b* may receive an indication of an action to perform based on suspending the wireless sensing procedure. For example, UE 115-*b* may switch from a sensing mode to a data transmission or reception mode, may receive a configuration for a data transmission or reception, or both based on the indication of the action to perform.

At 425, UE 115-*b* may determine to suspend the wireless sensing procedure for the one or more sensing signal burst occasions based on the control signaling from 410.

At 430, UE 115-*b* may pause the wireless sensing procedure. For example, UE 115-*b* may pause the wireless sensing procedure for a duration based on the indication of the duration, the indication of when to pause the wireless sensing procedure, or both. UE 115-*b* may perform an action based on the indication of the action to perform at 420. For example, UE 115-*b* may switch to a data transmission or reception mode from a sensing mode, may receive another configuration for the communications between UE 115-*b* and base station 105-*b*, or both.

At 435, UE 115-*b* and base station 105-*b* may perform data or control communications during a time period (e.g., the one or more overlapping, or colliding, sensing signal burst occasions) based on pausing the wireless sensing procedure. For example, UE 115-*b* and base station 105-*b* may communicate using the communication resources that overlap, or collide, with the one or more sensing signal burst occasions. UE 115-*b* may transmit or receive data or control signaling.

At 440, UE 115-*b* may receive a request to resume the wireless sensing procedure from base station 105-*b*. Base station 105-*b* may transmit the request to resume the wireless sensing procedure (e.g., in a DCI message, a MAC-CE, or both) based on a duration of the communications at 435.

At 445, UE 115-*b* may resume the wireless sensing procedure based on the request to resume the wireless sensing procedure, based on the indication of the duration to pause the wireless sensing procedure at 415, based on the sensing pattern, or a combination. In some examples, UE 115-*b* may pause the wireless sensing procedure one or more additional times based on a pattern for pausing the wireless sensing procedure, which may be included in the request to suspend the wireless sensing procedure at 410.

In some examples, UE 115-*b* may receive another request to suspend the wireless sensing procedure from base station 105-*b*. For example, if base station 105-*b* does not receive feedback from UE 115-*b* regarding the request to suspend the wireless sensing procedure at 410, base station 105-*b* may transmit another request to suspend the wireless sensing procedure after a time period.

Figure 5:
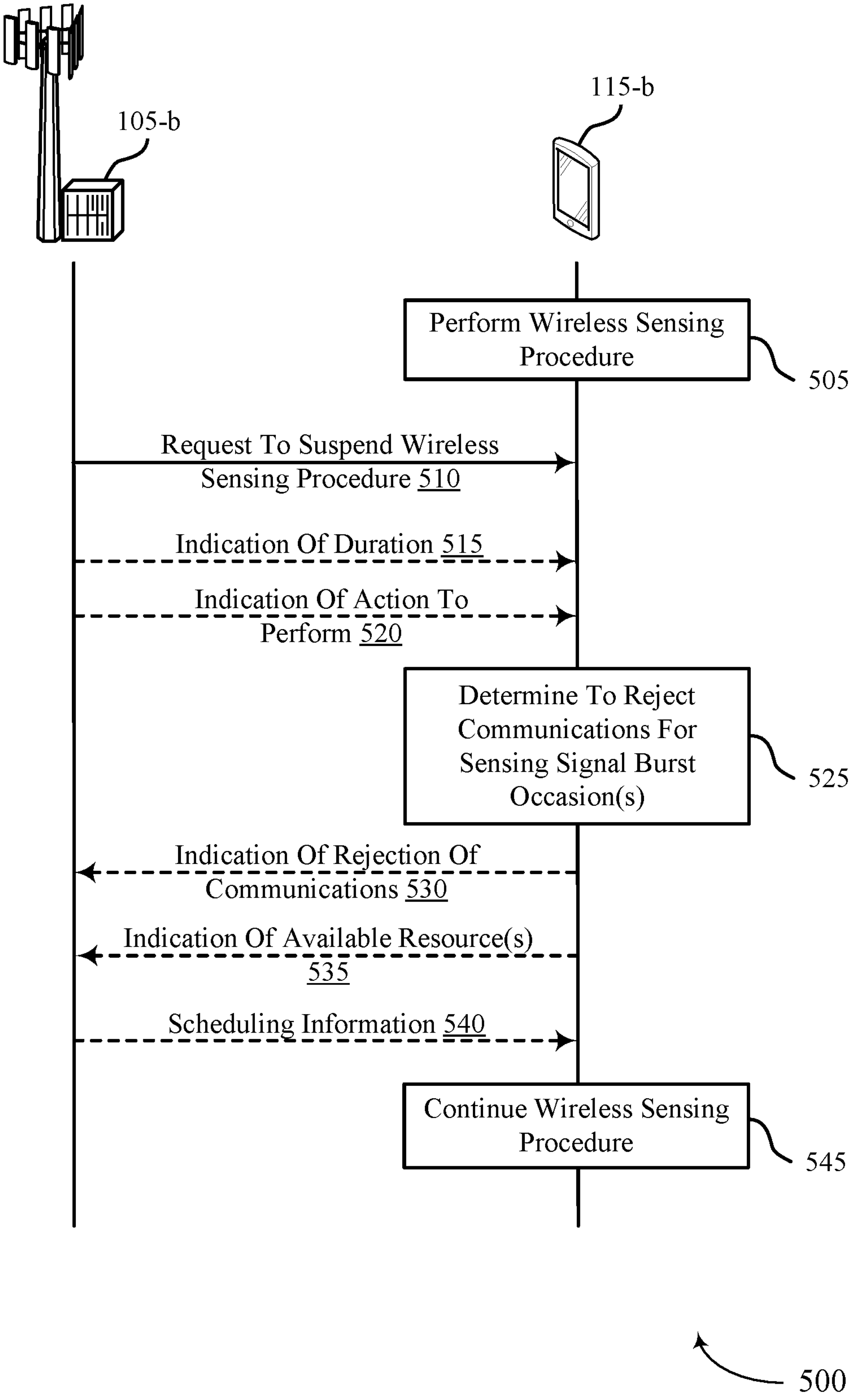

FIG. 5 illustrates an example of a process flow 500 that supports dynamic control of sensing durations in accordance with aspects of the present disclosure. In some examples, process flow 500 may implement aspects of wireless communication system 100, wireless communications system 200, timeline 300, or a combination. The process flow 500 may illustrate an example of a base station 105, such as base station 105-*c*, communicating control signaling with a UE 115, such as UE 115-*c*, including a request to suspend a wireless sensing procedure for one or more sensing signal burst occasions. In some examples, UE 115-*c* may selectively continue the wireless sensing procedure based on the control signaling. Alternative examples of the following may be implemented, where some processes are performed in a different order than described or are not performed. In some cases, processes may include additional features not mentioned below, or further processes may be added.

At 505, UE 115-*c* may perform a wireless sensing procedure, such as radar sensing, based on a sensing pattern defining one or more sensing signal burst occasions. UE 115-*c* may perform the wireless sensing procedure during the one or more sensing signal burst occasions. In some cases, the sensing pattern may be periodic, semi-persistent, aperiodic, or a combination.

At 510, UE 115-*c* may receive signaling from base station 105-*c* (e.g., a DCI block, a MAC-CE, or both) including a request to suspend the wireless sensing procedure based on a collision between the one or more sensing signal burst occasions and resources, such as time resources, for transmission or reception of data or control signaling between base station 105-*c* and UE 115-*c*. In some cases, the signaling may include a pattern of one or more resources during which UE 115-*c* is to suspend the wireless sensing procedure. For example, UE 115-*c* may receive an indication of a silent sensing resource index for each of the one or more resources (e.g., in a DCI block, a MAC-CE, or both).

At 515, UE 115-*c* may receive an indication of a duration to suspend the wireless sensing procedure. For example, UE 115-*c* may receive an indication of a start time to suspend the wireless sensing procedure (e.g., from bases station 105-*c* in the control signaling).

At 520, UE 115-*c* may receive an indication of an action to perform based on suspending the wireless sensing procedure. For example, UE 115-*c* may switch from a sensing mode to a data transmission or reception mode, may receive a configuration for a data transmission or reception, or both based on the indication of the action to perform.

At 525, UE 115-*c* may determine to reject communications (e.g., transmission or reception of data or control signaling) for the one or more sensing signal burst occasions based on the control signaling from 510.

At 530, UE 115-*c* may transmit an indication of the rejection of communications between UE 115-*c* and base station 105-*c*. At 535, UE 115-*c* may determine one or more available resources (e.g., based on the duration of the wireless sensing procedure, such as after the wireless sensing procedure ends). UE 115-*c* may transmit an indication of the available resources to base station 105-*c*.

At 540, UE 115-*c* may receive control signaling (e.g., a DCI block, MAC-CE, or the like) including scheduling information for the communications. The scheduling information may be outside of the one or more sensing signal burst occasions. In some examples, the scheduling information may be based on the indication of available resources from 535.

At 545, UE 115-*c* may continue the wireless sensing procedure. For example, UE 115-*c* may perform the wireless sensing procedure during a time period including the one or more sensing signal burst occasions.

In some examples, UE 115-*c* may receive another request to suspend the wireless sensing procedure from base station 105-*c*. For example, if base station 105-*c* does not receive feedback from UE 115-*c* regarding the request to suspend the wireless sensing procedure at 510, base station 105-*c* may transmit another request to suspend the wireless sensing procedure after a time period.

Figure 6:
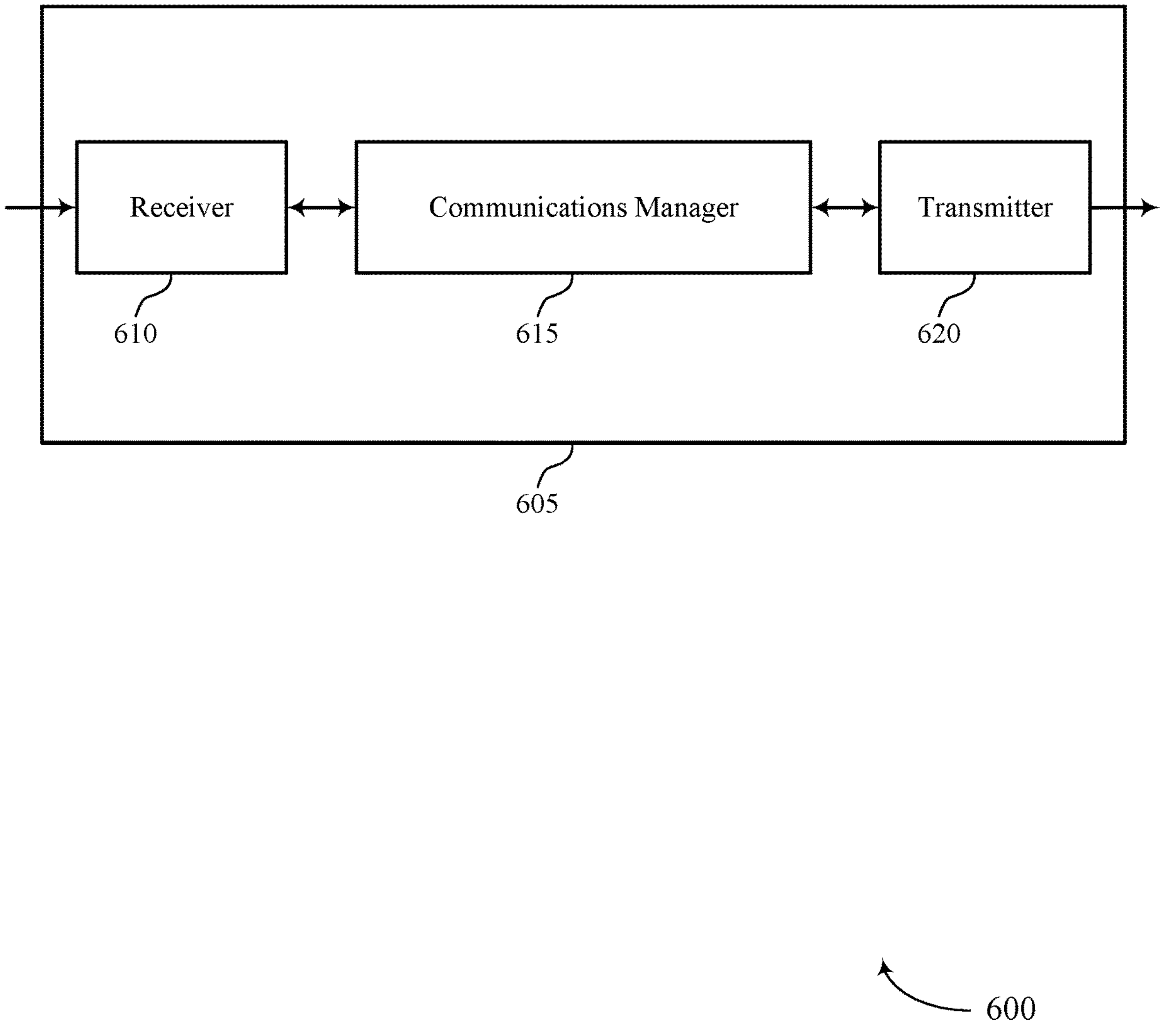
FIGS. 6 and 7 show block diagrams of devices that support dynamic control of sensing durations in accordance with aspects of the present disclosure.

FIG. 6 shows a block diagram 600 of a device 605 that supports dynamic control of sensing durations in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, or information related to dynamic control of sensing durations). Information may be passed on to other components of the device 605. The receiver 610 may be an example of aspects of the transceiver 920 described with reference to FIG. 9. The receiver 610 may utilize a single antenna or a set of antennas.

The communications manager 615 may perform a wireless sensing procedure based on a sensing pattern defining a set of sensing signal burst occasions, receive, from a base station, signaling including a request to suspend the wireless sensing procedure based on a collision between one or more sensing signal burst occasions in the set of sensing signal burst occasions and a data transmission between the base station and the UE, determine to suspend the wireless sensing procedure for the one or more sensing signal burst occasions or to reject the data transmission for the one or more sensing signal burst occasions based on the signaling, and selectively continue the wireless sensing procedure or pause the wireless sensing procedure based on the determining. The communications manager 615 may be an example of aspects of the communications manager 910 described herein.

The actions performed by the communications manager 615 as described herein may be implemented to realize one or more potential advantages. One implementation may enable a base station to transmit a request to suspend a wireless sensing procedure at a UE based on a resource collision between the wireless sensing procedure and communications between the UE and the base station. The request to suspend the wireless sensing procedure may enable the UE to communicate with the base station during the overlapping resources, which may improve communication latency (e.g., related to signaling or data retransmissions at the UE), among other advantages.

Based on implementing the request to suspend the wireless sensing procedure as described herein, a processor of a UE or a base station (e.g., a processor controlling the receiver 610, the communications manager 615, the transmitter 620, or a combination thereof) may reduce the impact or likelihood of inefficient communications due to the UE performing relatively low priority application wireless sensing operations during communication resources. For example, the UE may leverage a priority of the wireless sensing procedure to determine whether to pause the wireless sensing procedure to communicate with the base station, which may realize improved resource allocation at the UE, among other benefits.

The communications manager 615, or its sub-components, may be implemented in hardware, code (e.g., software) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
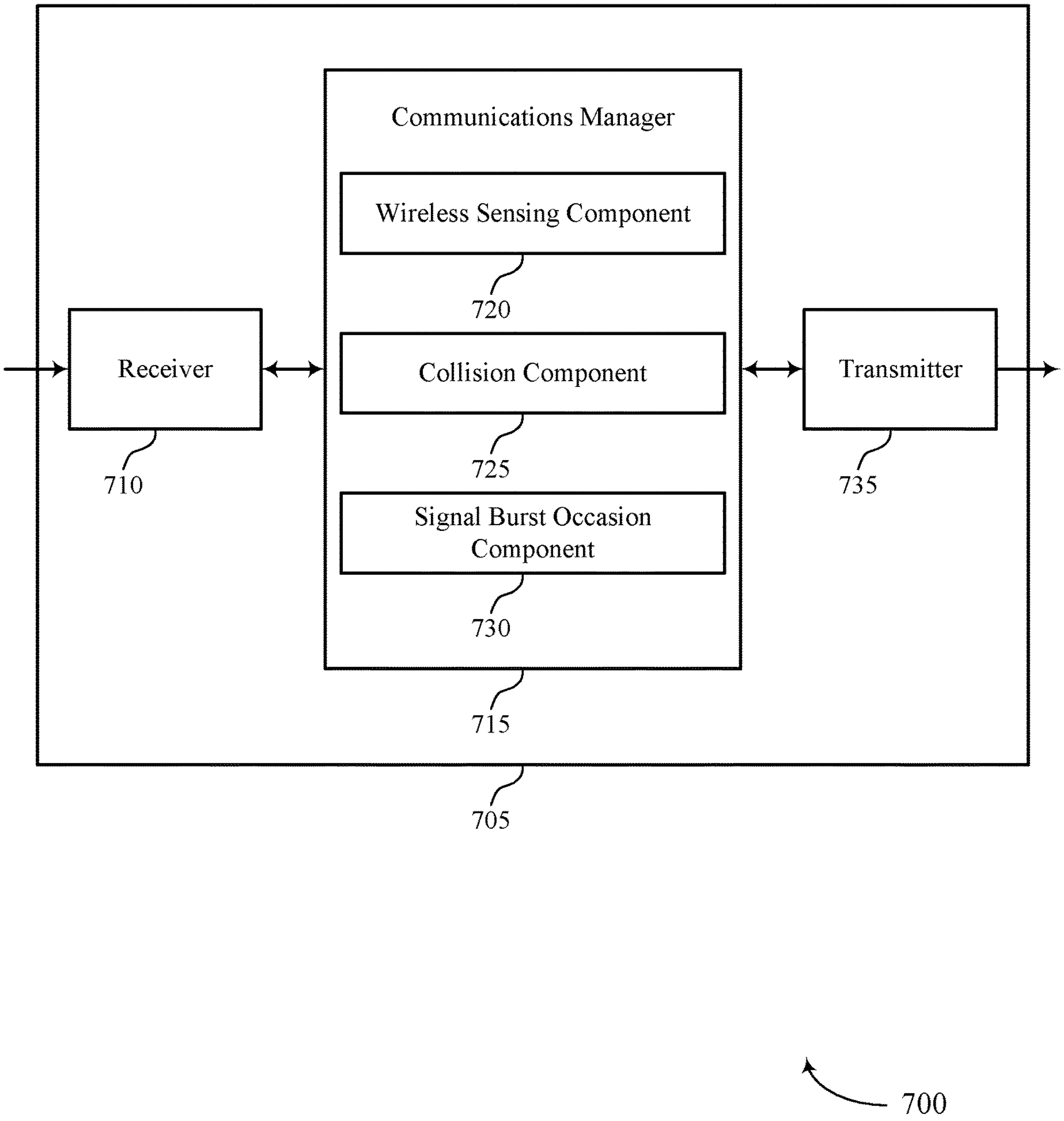

FIG. 7 shows a block diagram 700 of a device 705 that supports dynamic control of sensing durations in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, or information related to dynamic control of sensing durations). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a wireless sensing component 720, a collision component 725, and a signal burst occasion component 730. The communications manager 715 may be an example of aspects of the communications manager 910 described herein.

The wireless sensing component 720 may perform a wireless sensing procedure based on a sensing pattern defining a set of sensing signal burst occasions. The collision component 725 may receive, from a base station, signaling including a request to suspend the wireless sensing procedure based on a collision between one or more sensing signal burst occasions in the set of sensing signal burst occasions and a data transmission between the base station and the UE. The signal burst occasion component 730 may determine to suspend the wireless sensing procedure for the one or more sensing signal burst occasions or to reject the data transmission for the one or more sensing signal burst occasions based on the signaling. The wireless sensing component 720 may selectively continue the wireless sensing procedure or pause the wireless sensing procedure based on the determining The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
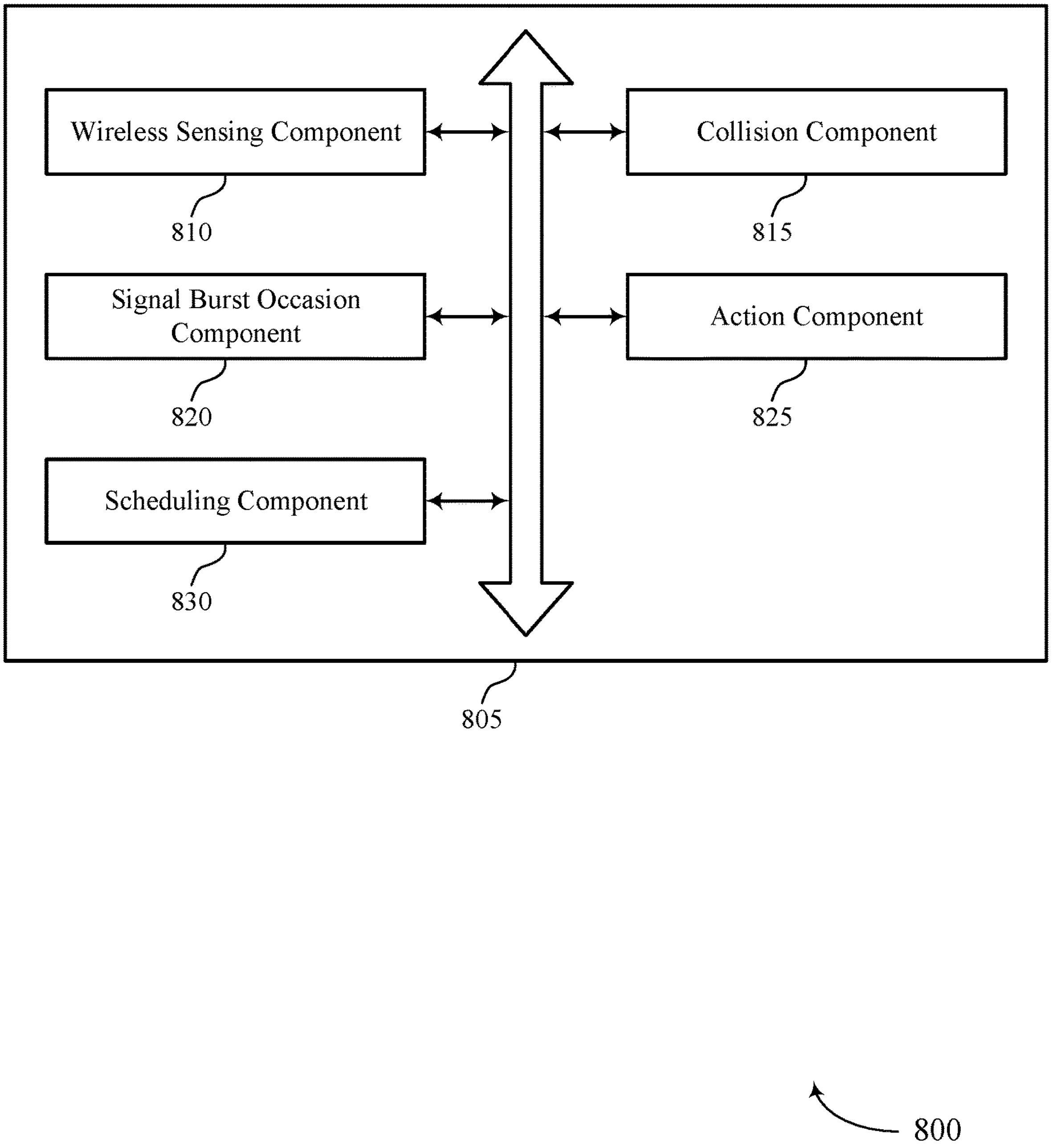
FIG. 8 shows a block diagram of a communications manager that supports dynamic control of sensing durations in accordance with aspects of the present disclosure.

FIG. 8 shows a block diagram 800 of a communications manager 805 that supports dynamic control of sensing durations in accordance with aspects of the present disclosure. The communications manager 805 may be an example of aspects of a communications manager 615, a communications manager 715, or a communications manager 910 described herein. The communications manager 805 may include a wireless sensing component 810, a collision component 815, a signal burst occasion component 820, an action component 825, and a scheduling component 830. Each of these modules may communicate, directly or indirectly, with one another (e.g., via one or more buses).

The wireless sensing component 810 may perform a wireless sensing procedure based on a sensing pattern defining a set of sensing signal burst occasions. The collision component 815 may receive, from a base station, signaling including a request to suspend the wireless sensing procedure based on a collision between one or more sensing signal burst occasions in the set of sensing signal burst occasions and a data transmission between the base station and the UE. The signal burst occasion component 820 may determine to suspend the wireless sensing procedure for the one or more sensing signal burst occasions or to reject the data transmission for the one or more sensing signal burst occasions based on the signaling. In some examples, the wireless sensing component 810 may selectively continuing the wireless sensing procedure or pausing the wireless sensing procedure based on the determining.

In some examples, the wireless sensing component 810 may receive, from the base station, second signaling including a request to resume performing the wireless sensing procedure. In some examples, the wireless sensing component 810 may resume, after the time period, performing the wireless sensing procedure based on the sensing pattern. In some examples, the wireless sensing component 810 may resume performing the wireless sensing procedure based on the request to resume performing the wireless sensing procedure.

In some examples, the collision component 815 may receive an indication of a start time to suspend the wireless sensing procedure corresponding to the set of sensing signal burst occasions. In some examples, the collision component 815 may receive an indication of a time duration during which the UE is to suspend the wireless sensing procedure.

The action component 825 may receive an indication of an action to perform based on suspending the wireless sensing procedure. In some examples, the action component 825 may switch from a sensing mode to a data transmission mode based on the indication of the action to perform. In some examples, the action component 825 may receive a configuration for the data transmission based on the indication of the action to perform.

In some examples, the collision component 815 may receive an indication of a pattern of one or more resources during which the UE is to suspend the wireless sensing procedure. In some examples, the collision component 815 may receive, from the base station, an indication of a silent sensing resource index for each of the one or more resources. In some examples, the collision component 815 may receive, from the base station, one or more of: a DCI block including the indication, a MAC-CE including the indication, or both. In some examples, the collision component 815 may receive, from the base station and after a time period, second signaling including a second request to suspend the wireless sensing procedure.

In some examples, the collision component 815 may receive the request in a downlink control information block, a MAC-CE, or both. In some examples, the signal burst occasion component 820 may communicate with the base station during a time period corresponding to the one or more sensing signal burst occasions.

In some examples, the wireless sensing component 810 may perform the wireless sensing procedure during a time period corresponding to the one or more sensing signal burst occasions. The scheduling component 830 may transmit, to the base station, an indication of the determination to reject the data transmission for the one or more sensing signal burst occasions. In some examples, the scheduling component 830 may receive second control signaling including scheduling information for the data transmission outside of the one or more sensing signal burst occasions. In some examples, the scheduling component 830 may transmit, to the base station, an indication of one or more available resources for the data transmission, where the scheduling information for the data transmission outside of the one or more sensing signal burst occasions is based on the indication of the one or more available resources for the data transmission.

Figure 9:
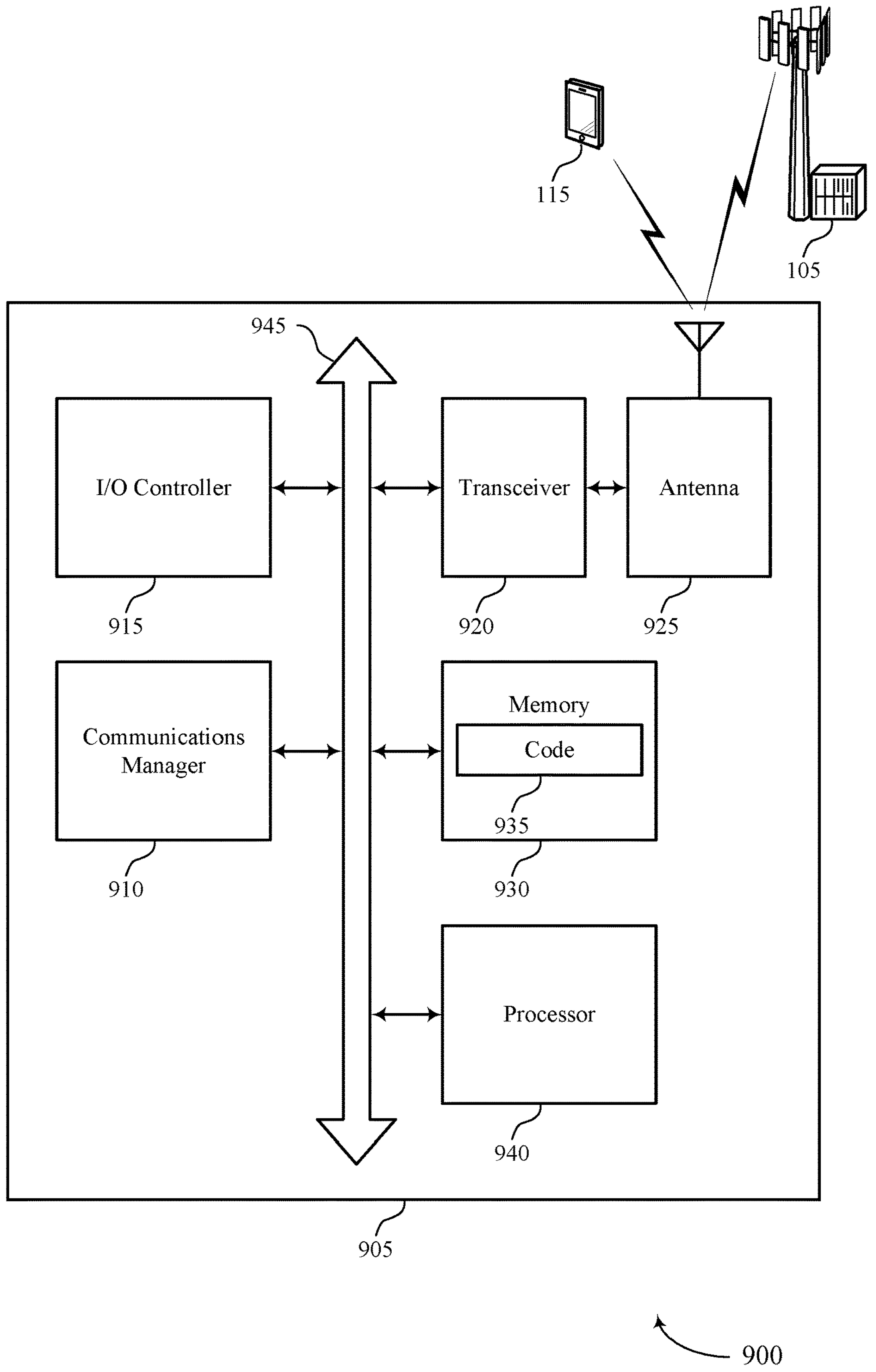
FIG. 9 shows a diagram of a system including a device that supports dynamic control of sensing durations in accordance with aspects of the present disclosure.

FIG. 9 shows a diagram of a system 900 including a device 905 that supports dynamic control of sensing durations in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may perform a wireless sensing procedure based on a sensing pattern defining a set of sensing signal burst occasions, receive, from a base station, signaling including a request to suspend the wireless sensing procedure based on a collision between one or more sensing signal burst occasions in the set of sensing signal burst occasions and a data transmission between the base station and the UE, determine to suspend the wireless sensing procedure for the one or more sensing signal burst occasions or to reject the data transmission for the one or more sensing signal burst occasions based on the signaling, and selectively continue the wireless sensing procedure or pause the wireless sensing procedure based on the determining.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic control of sensing durations).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
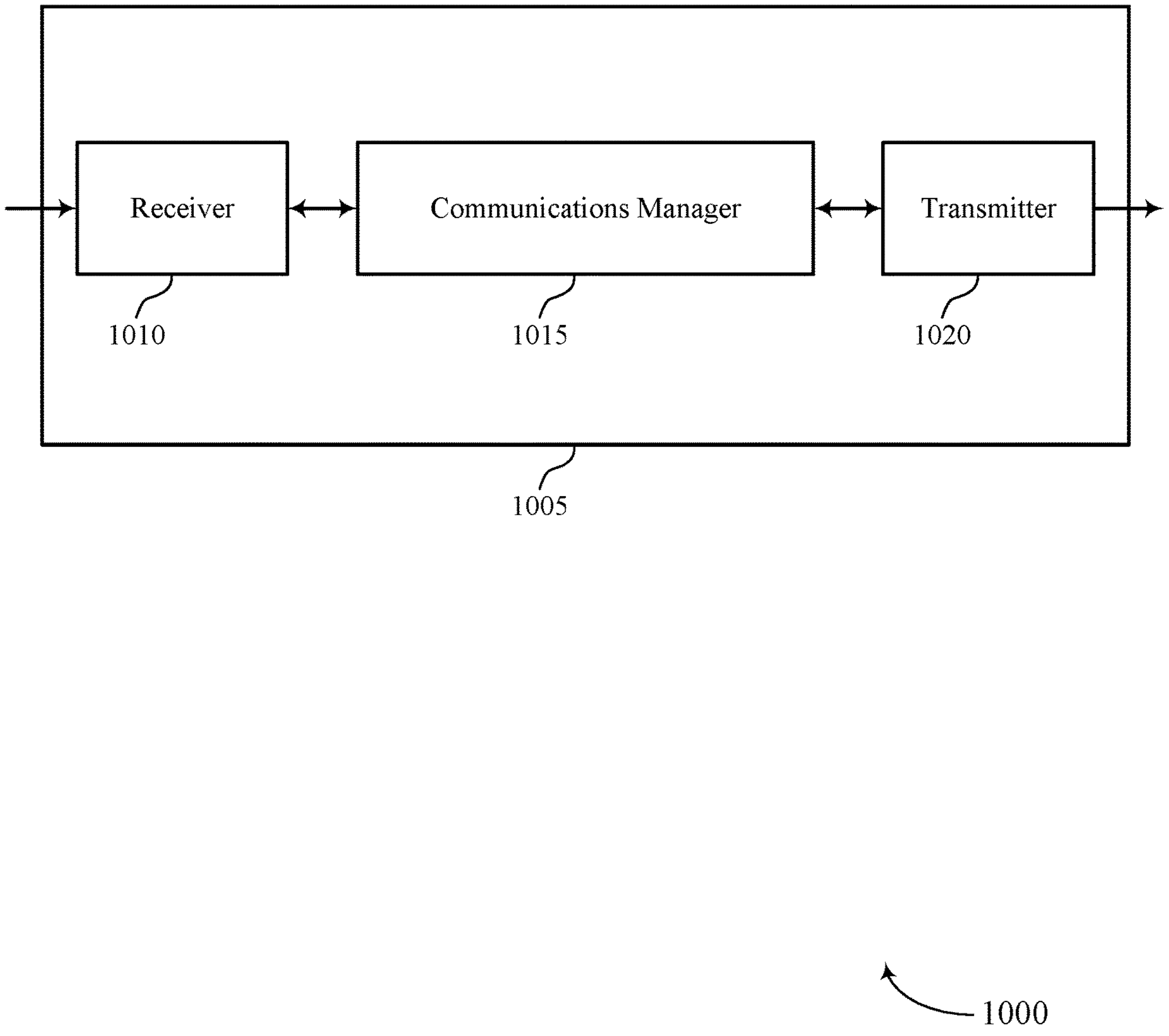
FIGS. 10 and 11 show block diagrams of devices that support dynamic control of sensing durations in accordance with aspects of the present disclosure.

FIG. 10 shows a block diagram 1000 of a device 1005 that supports dynamic control of sensing durations in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, or information related to dynamic control of sensing durations). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, signaling including a request to suspend a wireless sensing procedure based on a collision between one or more sensing signal burst occasions in a set of sensing signal burst occasions and a data transmission between the base station and the UE, determine whether the UE has suspended the wireless sensing procedure based on the signaling, and communicate with the UE based on transmitting the determination. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
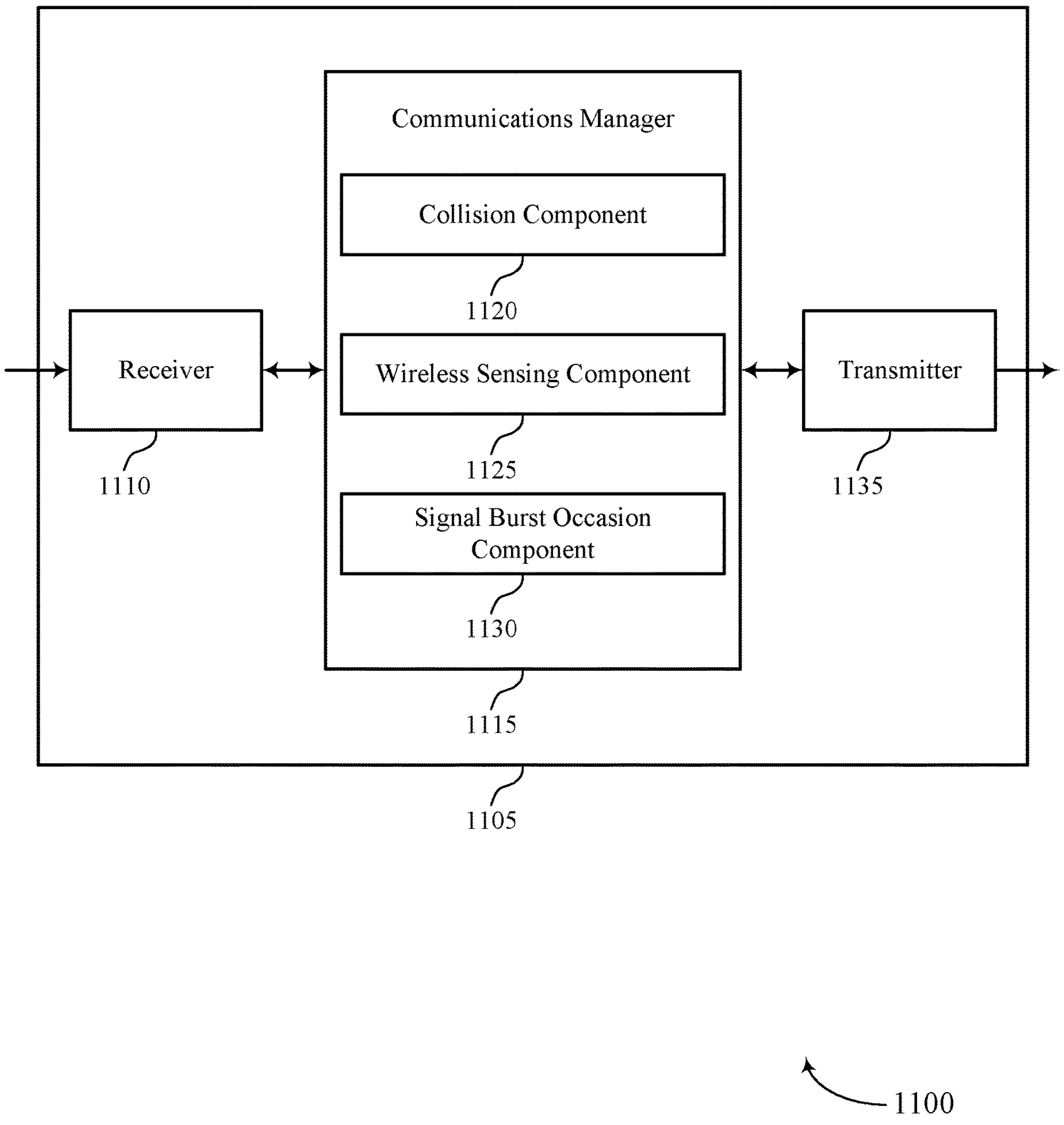

FIG. 11 shows a block diagram 1100 of a device 1105 that supports dynamic control of sensing durations in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, or information related to dynamic control of sensing durations). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a collision component 1120, a wireless sensing component 1125, and a signal burst occasion component 1130. The communications manager 1115 may be an example of aspects of the communications manager 1310 described herein.

The collision component 1120 may transmit, to a UE, signaling including a request to suspend a wireless sensing procedure based on a collision between one or more sensing signal burst occasions in a set of sensing signal burst occasions and a data transmission between the base station and the UE. The wireless sensing component 1125 may determine whether the UE has suspended the wireless sensing procedure based on the signaling. The signal burst occasion component 1130 may communicate with the UE based on transmitting the determination.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
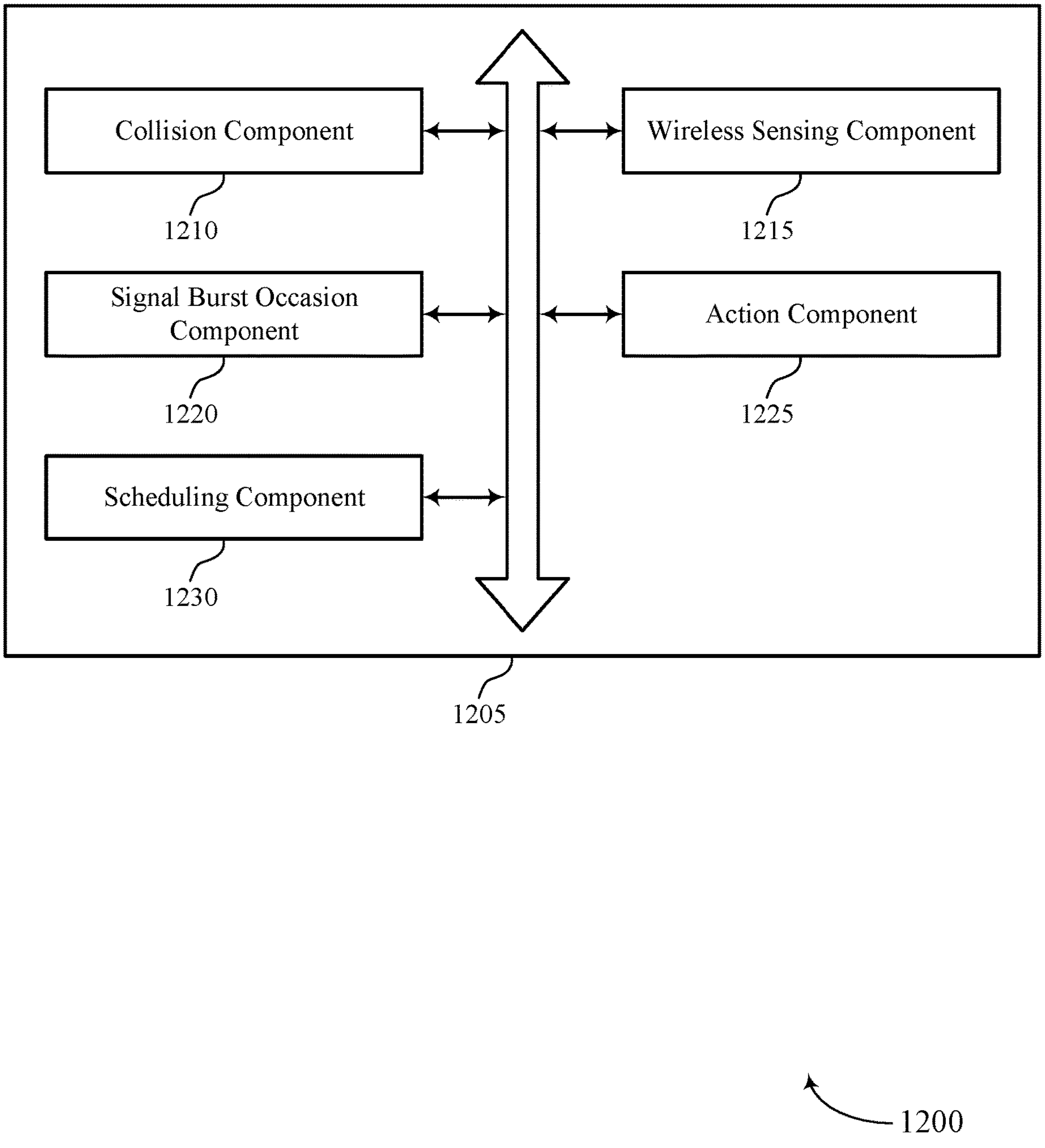
FIG. 12 shows a block diagram of a communications manager that supports dynamic control of sensing durations in accordance with aspects of the present disclosure.

FIG. 12 shows a block diagram 1200 of a communications manager 1205 that supports dynamic control of sensing durations in accordance with aspects of the present disclosure. The communications manager 1205 may be an example of aspects of a communications manager 1015, a communications manager 1115, or a communications manager 1310 described herein. The communications manager 1205 may include a collision component 1210, a wireless sensing component 1215, a signal burst occasion component 1220, an action component 1225, and a scheduling component 1230. Each of these modules may communicate, directly or indirectly, with one another (e.g., via one or more buses).

The collision component 1210 may transmit, to a UE, signaling including a request to suspend a wireless sensing procedure based on a collision between one or more sensing signal burst occasions in a set of sensing signal burst occasions and a data transmission between the base station and the UE. The wireless sensing component 1215 may determine whether the UE has suspended the wireless sensing procedure based on the signaling. The signal burst occasion component 1220 may communicate with the UE based on transmitting the determination.

In some examples, the collision component 1210 may transmit an indication of a start time to suspend the wireless sensing procedure corresponding to the set of sensing signal burst occasions. In some examples, the collision component 1210 may transmit an indication of a time duration during which the UE is to suspend the wireless sensing procedure. In some examples, the collision component 1210 may transmit an indication of a pattern of one or more resources during which the UE is to suspend the wireless sensing procedure. In some examples, the collision component 1210 may transmit, to the UE, an indication of a silent sensing resource index for each of the one or more resources. In some examples, the collision component 1210 may transmit, to the UE, one or more of: a DCI block including the indication, a MAC-CE including the indication, or both.

The action component 1225 may transmit an indication of an action to perform based on suspending the wireless sensing procedure. In some examples, the action component 1225 may transmit a configuration for the data transmission based on the indication of the action to perform.

In some examples, the collision component 1210 may transmit, to the UE and after a time period, second signaling including a second request to suspend the wireless sensing procedure. In some examples, the collision component 1210 may transmit the request in a DCI block, a MAC-CE, or both.

In some examples, the signal burst occasion component 1220 may communicate with the UE during a time period corresponding to the one or more sensing signal burst occasions. In some examples, the wireless sensing component 1215 may transmit, to the UE, second signaling including a request to resume performing the wireless sensing procedure.

In some examples, the signal burst occasion component 1220 may determine whether the UE is performing the wireless sensing procedure during a time period corresponding to the one or more sensing signal burst occasions. The scheduling component 1230 may receive, from the UE, an indication of the determination to reject the data transmission for the one or more sensing signal burst occasions. In some examples, the scheduling component 1230 may transmit second control signaling including scheduling information for the data transmission outside of the one or more sensing signal burst occasions. In some examples, the scheduling component 1230 may receive, from the UE, an indication of one or more available resources for the data transmission, where the scheduling information for the data transmission outside of the one or more sensing signal burst occasions is based on the indication of the one or more available resources for the data transmission.

Figure 13:
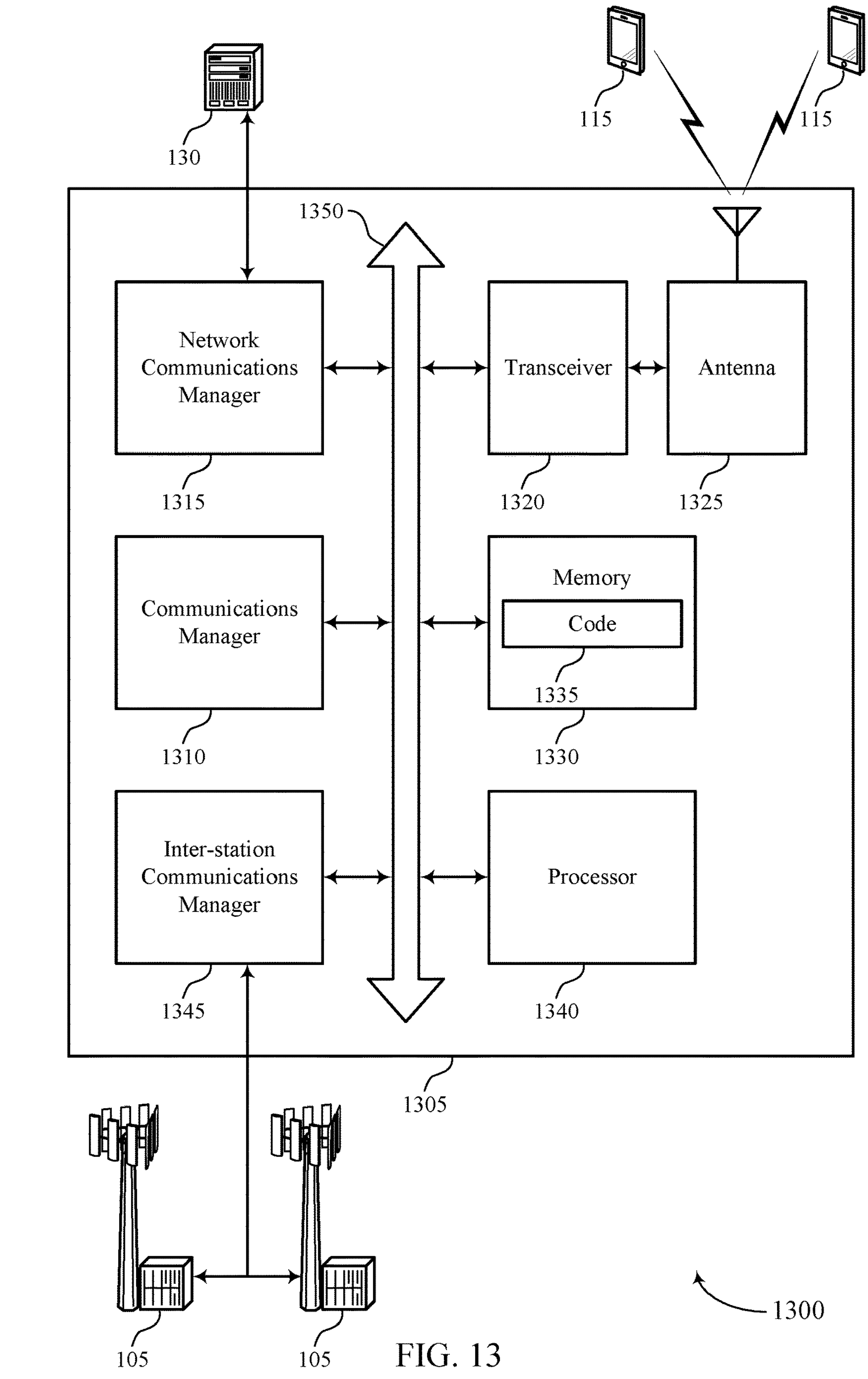
FIG. 13 shows a diagram of a system including a device that supports dynamic control of sensing durations in accordance with aspects of the present disclosure.

FIG. 13 shows a diagram of a system 1300 including a device 1305 that supports dynamic control of sensing durations in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, signaling including a request to suspend a wireless sensing procedure based on a collision between one or more sensing signal burst occasions in a set of sensing signal burst occasions and a data transmission between the base station and the UE, determine whether the UE has suspended the wireless sensing procedure based on the signaling, and communicate with the UE based on transmitting the determination.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting dynamic control of sensing durations).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
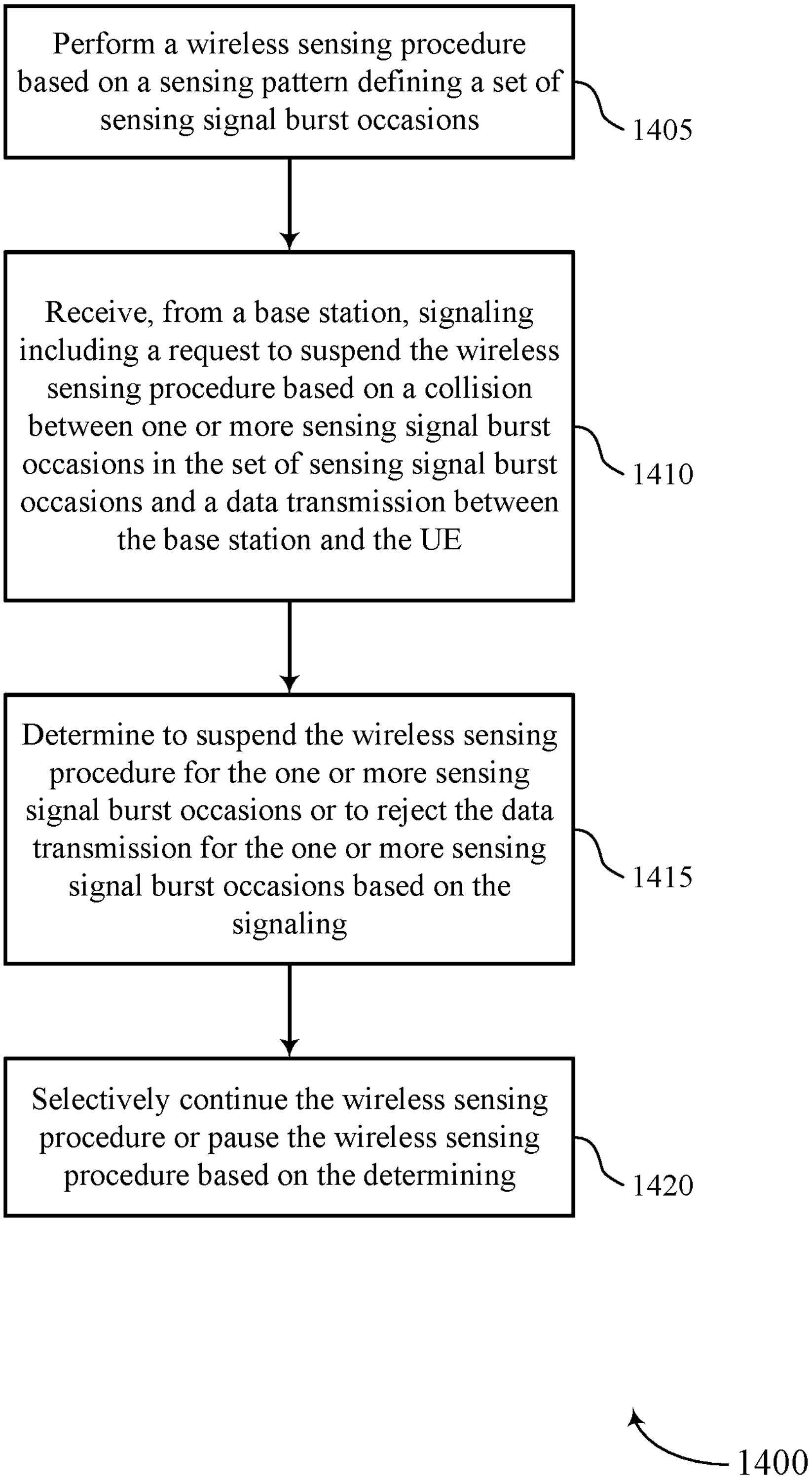
FIGS. 14 through 18 show flowcharts illustrating methods that support dynamic control of sensing durations in accordance with aspects of the present disclosure.

FIG. 14 shows a flowchart illustrating a method 1400 that supports dynamic control of sensing durations in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may perform a wireless sensing procedure based on a sensing pattern defining a set of sensing signal burst occasions. The operations of 1405 may be performed according to the methods described herein. In some examples, aspects of the operations of 1405 may be performed by a wireless sensing component as described with reference to FIGS. 6 through 9.

At 1410, the UE may receive, from a base station, signaling including a request to suspend the wireless sensing procedure based on a collision between one or more sensing signal burst occasions in the set of sensing signal burst occasions and a data transmission between the base station and the UE. The operations of 1410 may be performed according to the methods described herein. In some examples, aspects of the operations of 1410 may be performed by a collision component as described with reference to FIGS. 6 through 9.

At 1415, the UE may determine to suspend the wireless sensing procedure for the one or more sensing signal burst occasions or to reject the data transmission for the one or more sensing signal burst occasions based on the signaling. The operations of 1415 may be performed according to the methods described herein. In some examples, aspects of the operations of 1415 may be performed by a signal burst occasion component as described with reference to FIGS. 6 through 9.

At 1420, the UE may selectively continue the wireless sensing procedure or pause the wireless sensing procedure based on the determining. The operations of 1420 may be performed according to the methods described herein. In some examples, aspects of the operations of 1420 may be performed by a wireless sensing component as described with reference to FIGS. 6 through 9.

Figure 15:
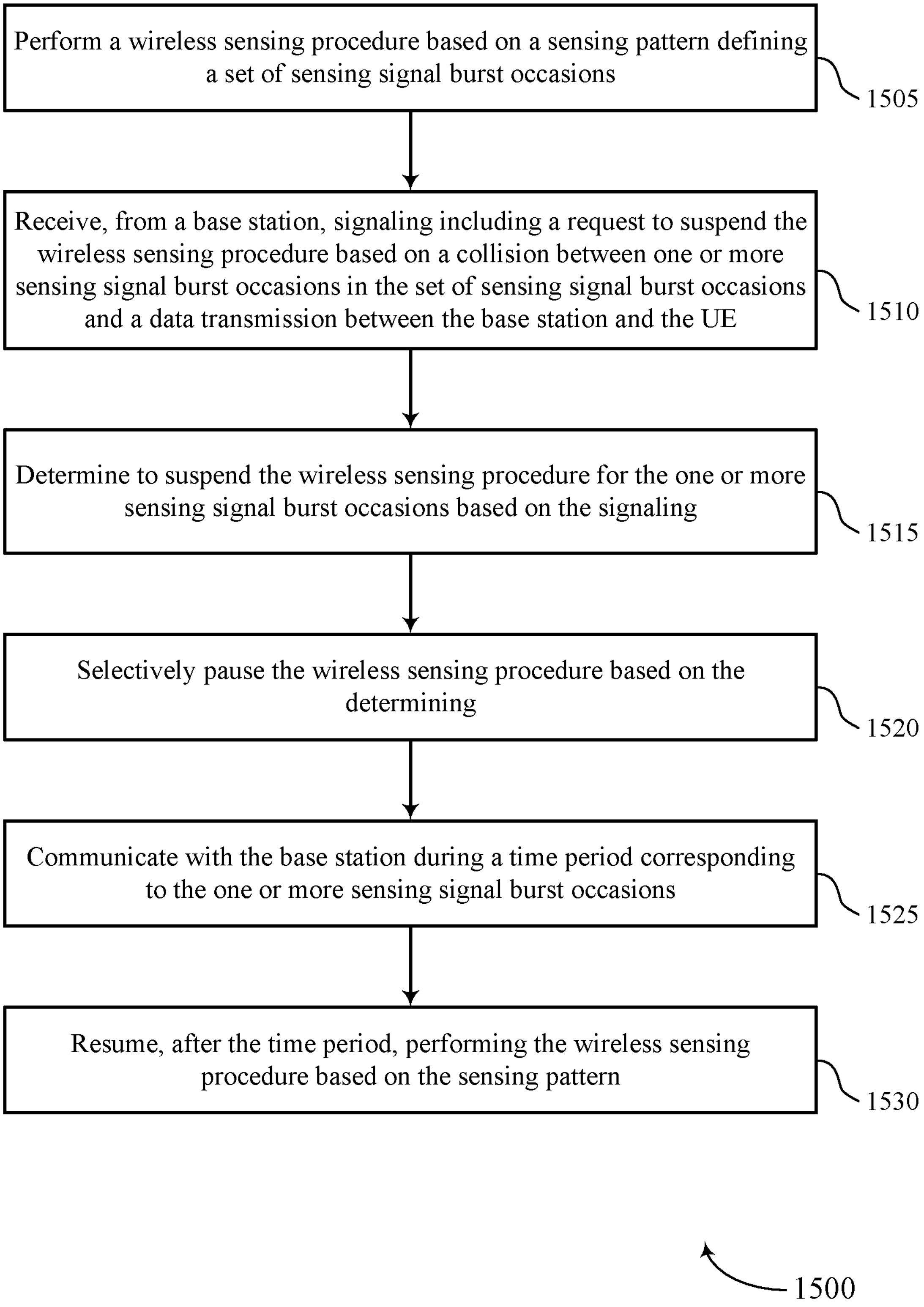

FIG. 15 shows a flowchart illustrating a method 1500 that supports dynamic control of sensing durations in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may perform a wireless sensing procedure based on a sensing pattern defining a set of sensing signal burst occasions. The operations of 1505 may be performed according to the methods described herein. In some examples, aspects of the operations of 1505 may be performed by a wireless sensing component as described with reference to FIGS. 6 through 9.

At 1510, the UE may receive, from a base station, signaling including a request to suspend the wireless sensing procedure based on a collision between one or more sensing signal burst occasions in the set of sensing signal burst occasions and a data transmission between the base station and the UE. The operations of 1510 may be performed according to the methods described herein. In some examples, aspects of the operations of 1510 may be performed by a collision component as described with reference to FIGS. 6 through 9.

At 1515, the UE may determine to suspend the wireless sensing procedure for the one or more sensing signal burst occasions based on the signaling. The operations of 1515 may be performed according to the methods described herein. In some examples, aspects of the operations of 1515 may be performed by a signal burst occasion component as described with reference to FIGS. 6 through 9.

At 1520, the UE may selectively pause the wireless sensing procedure based on the determining. The operations of 1520 may be performed according to the methods described herein. In some examples, aspects of the operations of 1520 may be performed by a wireless sensing component as described with reference to FIGS. 6 through 9.

At 1525, the UE may communicate with the base station during a time period corresponding to the one or more sensing signal burst occasions. The operations of 1525 may be performed according to the methods described herein. In some examples, aspects of the operations of 1525 may be performed by a signal burst occasion component as described with reference to FIGS. 6 through 9.

At 1530, the UE may resume, after the time period, performing the wireless sensing procedure based on the sensing pattern. The operations of 1530 may be performed according to the methods described herein. In some examples, aspects of the operations of 1530 may be performed by a wireless sensing component as described with reference to FIGS. 6 through 9.

Figure 16:
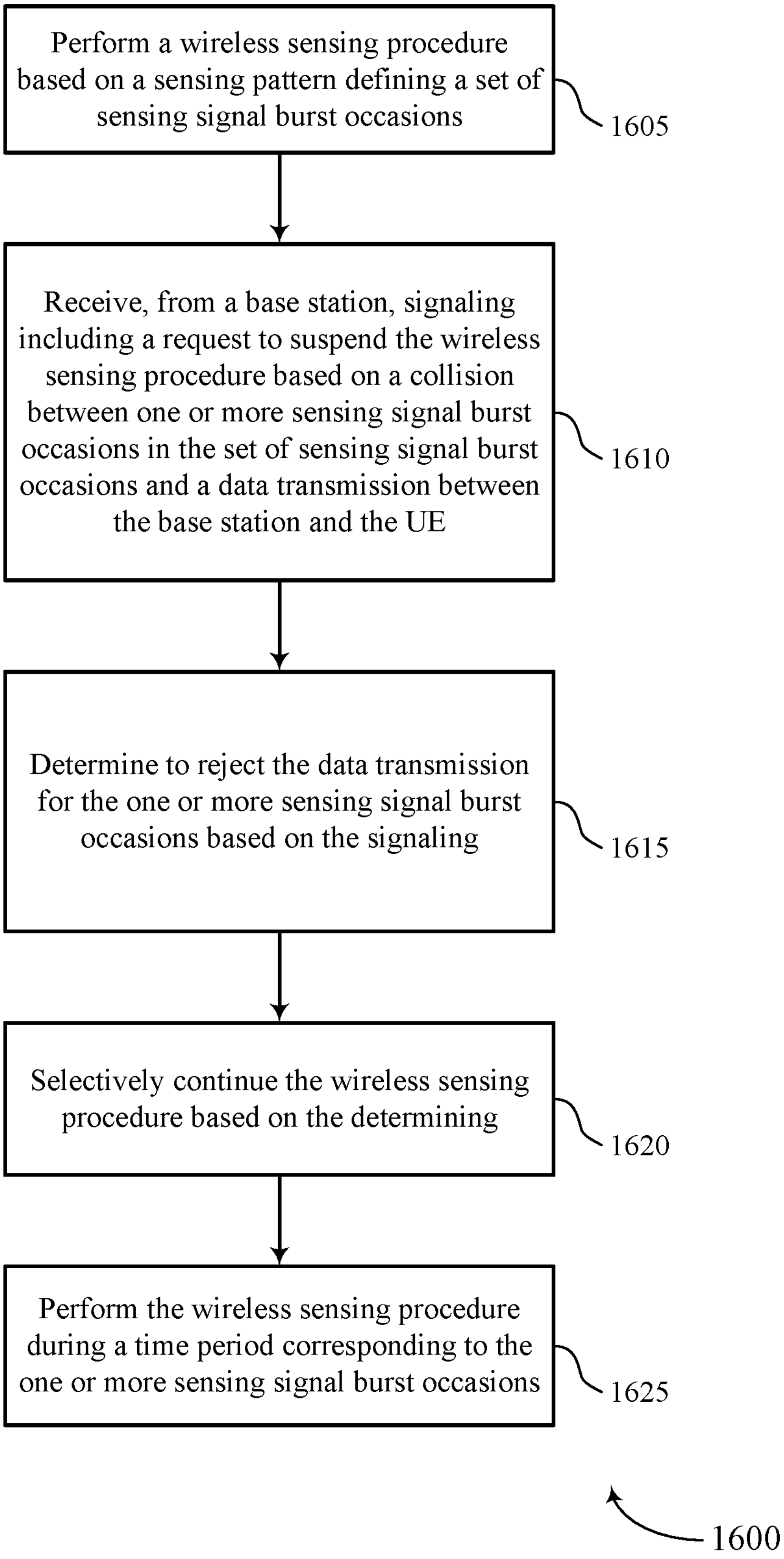

FIG. 16 shows a flowchart illustrating a method 1600 that supports dynamic control of sensing durations in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may perform a wireless sensing procedure based on a sensing pattern defining a set of sensing signal burst occasions. The operations of 1605 may be performed according to the methods described herein. In some examples, aspects of the operations of 1605 may be performed by a wireless sensing component as described with reference to FIGS. 6 through 9.

At 1610, the UE may receive, from a base station, signaling including a request to suspend the wireless sensing procedure based on a collision between one or more sensing signal burst occasions in the set of sensing signal burst occasions and a data transmission between the base station and the UE. The operations of 1610 may be performed according to the methods described herein. In some examples, aspects of the operations of 1610 may be performed by a collision component as described with reference to FIGS. 6 through 9.

At 1615, the UE may determine to reject the data transmission for the one or more sensing signal burst occasions based on the signaling. The operations of 1615 may be performed according to the methods described herein. In some examples, aspects of the operations of 1615 may be performed by a signal burst occasion component as described with reference to FIGS. 6 through 9.

At 1620, the UE may selectively continue the wireless sensing procedure based on the determining. The operations of 1620 may be performed according to the methods described herein. In some examples, aspects of the operations of 1620 may be performed by a wireless sensing component as described with reference to FIGS. 6 through 9.

At 1625, the UE may perform the wireless sensing procedure during a time period corresponding to the one or more sensing signal burst occasions. The operations of 1625 may be performed according to the methods described herein. In some examples, aspects of the operations of 1625 may be performed by a wireless sensing component as described with reference to FIGS. 6 through 9.

Figure 17:
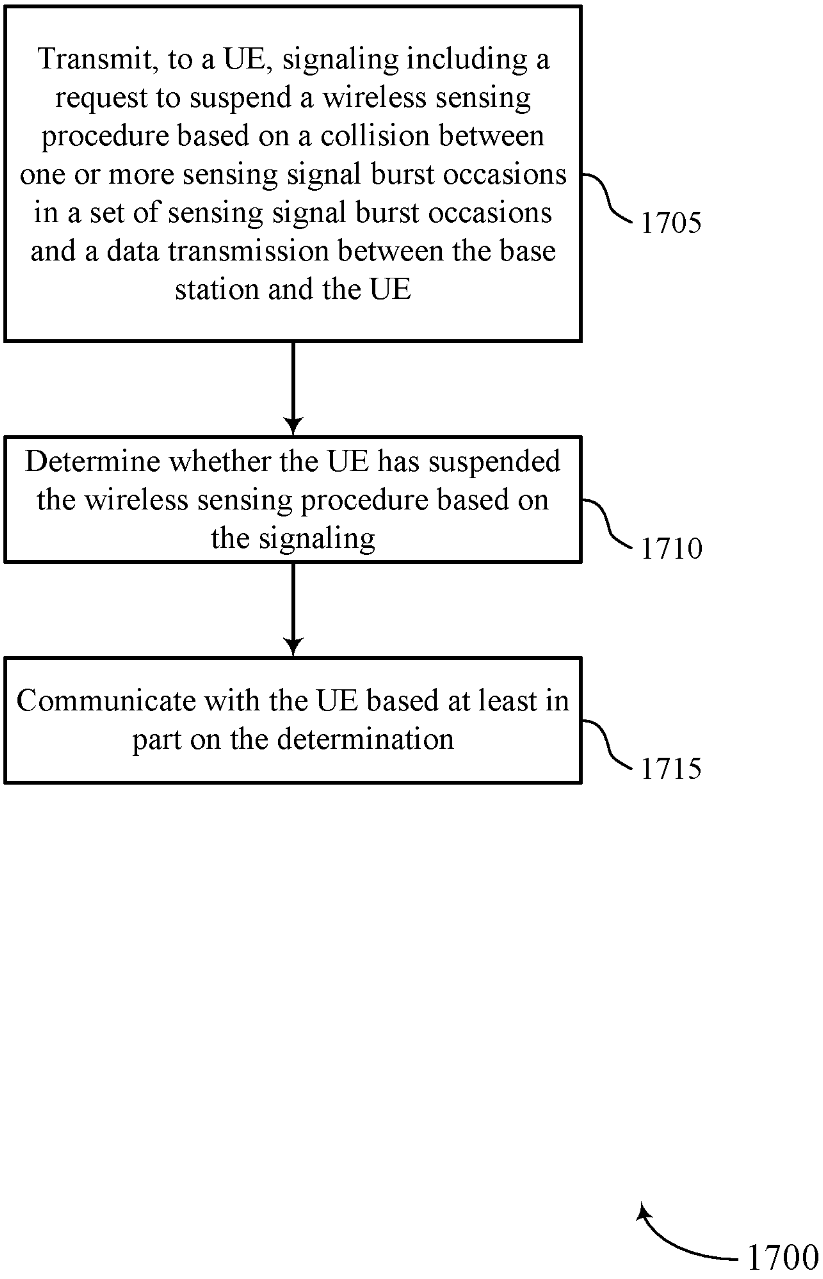

FIG. 17 shows a flowchart illustrating a method 1700 that supports dynamic control of sensing durations in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, signaling including a request to suspend a wireless sensing procedure based on a collision between one or more sensing signal burst occasions in a set of sensing signal burst occasions and a data transmission between the base station and the UE. The operations of 1705 may be performed according to the methods described herein. In some examples, aspects of the operations of 1705 may be performed by a collision component as described with reference to FIGS. 10 through 13.

At 1710, the base station may determine whether the UE has suspended the wireless sensing procedure based on the signaling. The operations of 1710 may be performed according to the methods described herein. In some examples, aspects of the operations of 1710 may be performed by a wireless sensing component as described with reference to FIGS. 10 through 13.

At 1715, the base station may communicate with the UE based at least in part on the determination. The operations of 1715 may be performed according to the methods described herein. In some examples, aspects of the operations of 1715 may be performed by a signal burst occasion component as described with reference to FIGS. 10 through 13.

Figure 18:
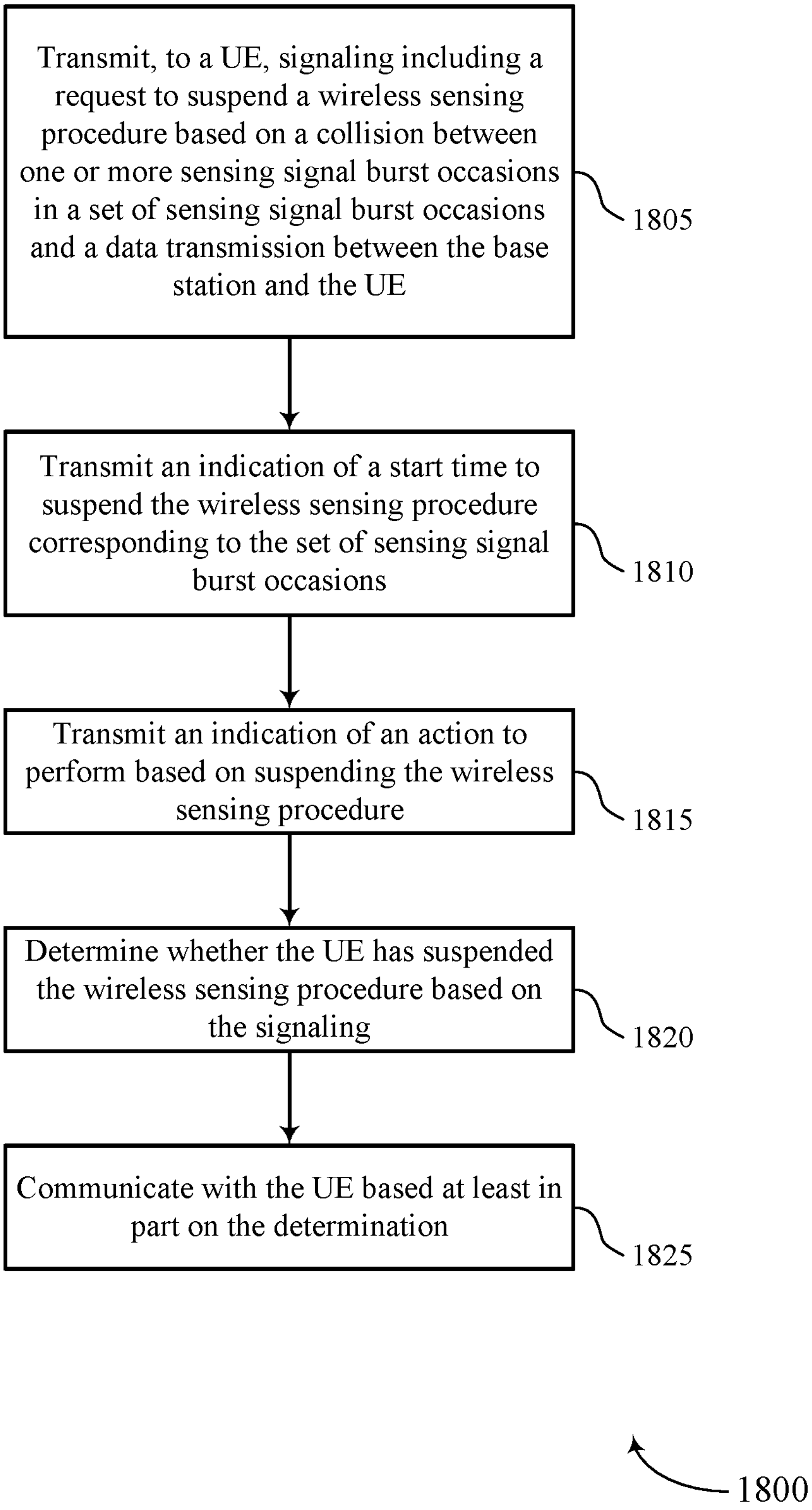

FIG. 18 shows a flowchart illustrating a method 1800 that supports dynamic control of sensing durations in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, signaling including a request to suspend a wireless sensing procedure based on a collision between one or more sensing signal burst occasions in a set of sensing signal burst occasions and a data transmission between the base station and the UE. The operations of 1805 may be performed according to the methods described herein. In some examples, aspects of the operations of 1805 may be performed by a collision component as described with reference to FIGS. 10 through 13.

At 1810, the base station may transmit an indication of a start time to suspend the wireless sensing procedure corresponding to the set of sensing signal burst occasions. The operations of 1810 may be performed according to the methods described herein. In some examples, aspects of the operations of 1810 may be performed by a collision component as described with reference to FIGS. 10 through 13.

At 1815, the base station may transmit an indication of an action to perform based on suspending the wireless sensing procedure. The operations of 1815 may be performed according to the methods described herein. In some examples, aspects of the operations of 1815 may be performed by an action component as described with reference to FIGS. 10 through 13.

At 1820, the base station may determine whether the UE has suspended the wireless sensing procedure based on the signaling. The operations of 1820 may be performed according to the methods described herein. In some examples, aspects of the operations of 1820 may be performed by a wireless sensing component as described with reference to FIGS. 10 through 13.

At 1825, the base station may communicate with the UE based at least in part on the determination. The operations of 1825 may be performed according to the methods described herein. In some examples, aspects of the operations of 1825 may be performed by a signal burst occasion component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

performing a wireless sensing procedure based at least in part on a sensing pattern defining a plurality of sensing signal burst occasions, the wireless sensing procedure comprising radar sensing;

receiving signaling comprising a request to suspend the wireless sensing procedure based at least in part on a collision between one or more sensing signal burst occasions in the plurality of sensing signal burst occasions and a data transmission between a network device and the UE;

determining to suspend the wireless sensing procedure for the one or more sensing signal burst occasions or to reject the data transmission for the one or more sensing signal burst occasions based at least in part on the signaling and on a priority of the wireless sensing procedure; and selectively continuing the wireless sensing procedure or pausing the wireless sensing procedure based at least in part on the determining.

2. The method of claim 1, wherein receiving the signaling further comprises:

receiving an indication of a start time to suspend the wireless sensing procedure corresponding to the plurality of sensing signal burst occasions; and receiving an indication of an action to perform based at least in part on suspending the wireless sensing procedure.

3. The method of claim 2, further comprising:

switching from a sensing mode to a data transmission mode based at least in part on the indication of the action to perform.

4. The method of claim 2, further comprising:

receiving a configuration for the data transmission based at least in part on the indication of the action to perform.

5. The method of claim 1, wherein selectively pausing the wireless sensing procedure comprises:

communicating with the network device during a time period corresponding to the one or more sensing signal burst occasions; and resuming, after the time period, performing the wireless sensing procedure based at least in part on the sensing pattern.

6. The method of claim 5, further comprising:

receiving second signaling comprising a request to resume performing the wireless sensing procedure; and resuming performing the wireless sensing procedure based at least in part on the request to resume performing the wireless sensing procedure.

7. The method of claim 6, wherein the second signaling comprises a downlink control message, a medium access control-control element, or both.

8. The method of claim 1, wherein receiving the signaling further comprises:

receiving an indication of a time duration during which the UE is to suspend the wireless sensing procedure.

9. The method of claim 1, wherein receiving the signaling further comprises:

receiving an indication of a pattern of one or more resources during which the UE is to suspend the wireless sensing procedure.

10. The method of claim 9, further comprising:

receiving an indication of a silent sensing resource index for each of the one or more resources.

11. The method of claim 9, further comprising:

receiving one or more of: a downlink control information block comprising the indication, a medium access control (MAC) control element comprising the indication, or both.

12. The method of claim 1, wherein selectively continuing the wireless sensing procedure comprises:

performing the wireless sensing procedure during a time period corresponding to the one or more sensing signal burst occasions.

13. The method of claim 12, further comprising:

transmitting an indication of the determination to reject the data transmission for the one or more sensing signal burst occasions; and receiving second control signaling comprising scheduling information for the data transmission outside of the one or more sensing signal burst occasions.

14. The method of claim 13, further comprising:

transmitting an indication of one or more available resources for the data transmission, wherein the scheduling information for the data transmission outside of the one or more sensing signal burst occasions is based at least in part on the indication of the one or more available resources for the data transmission.

15. The method of claim 1, further comprising:

receiving after a time period, second signaling comprising a second request to suspend the wireless sensing procedure.

16. The method of claim 1, wherein receiving the signaling further comprises:

receiving the request in a downlink control information block, a medium access control (MAC) control element, or both.

17. The method of claim 1, wherein the sensing pattern is a periodic sensing pattern, a semi-persistent sensing pattern, an aperiodic sensing pattern, or any combination thereof.

18. A method for wireless communications at a network device, comprising:

transmitting, to a user equipment (UE), signaling comprising a request to suspend a wireless sensing procedure based at least in part on a collision between one or more sensing signal burst occasions in a plurality of sensing signal burst occasions and a data transmission between the network device and the UE, the wireless sensing procedure comprising radar sensing;

determining whether the UE has suspended the wireless sensing procedure, wherein suspension of the wireless sensing procedure is based at least in part on the signaling and on a priority of the wireless sensing procedure; and communicating with the UE based at least in part on the determination.

19. The method of claim 18, wherein transmitting the signaling further comprises:

transmitting an indication of a start time to suspend the wireless sensing procedure corresponding to the plurality of sensing signal burst occasions; and transmitting an indication of an action to perform based at least in part on suspending the wireless sensing procedure.

20. The method of claim 19, further comprising:

transmitting a configuration for the data transmission based at least in part on the indication of the action to perform.

21. The method of claim 18, further comprising:

communicating with the UE during a time period corresponding to the one or more sensing signal burst occasions.

22. The method of claim 21, further comprising:

transmitting second signaling comprising a request to resume performing the wireless sensing procedure.

23. The method of claim 18, wherein transmitting the signaling further comprises:

transmitting an indication of a time duration during which the UE is to suspend the wireless sensing procedure.

24. The method of claim 18, wherein transmitting the signaling further comprises:

transmitting an indication of a pattern of one or more resources during which the UE is to suspend the wireless sensing procedure.

25. The method of claim 24, further comprising:

transmitting an indication of a silent sensing resource index for each of the one or more resources.

26. The method of claim 18, wherein determining whether the UE has suspended the wireless sensing procedure comprises:

determining whether the UE is performing the wireless sensing procedure during a time period corresponding to the one or more sensing signal burst occasions.

27. The method of claim 26, further comprising:

receiving an indication of the determination to reject the data transmission for the one or more sensing signal burst occasions; and transmitting second control signaling comprising scheduling information for the data transmission outside of the one or more sensing signal burst occasions.

28. The method of claim 18, further comprising:

transmitting, after a time period, second signaling comprising a second request to suspend the wireless sensing procedure.

29. An apparatus for wireless communications at a user equipment (UE), comprising:

at least one processor; and memory coupled with the at least one processor, the memory storing instructions for the at least one processor to cause the UE to:

perform a wireless sensing procedure based at least in part on a sensing pattern defining a plurality of sensing signal burst occasions, the wireless sensing procedure comprising radar sensing;

receive signaling comprising a request to suspend the wireless sensing procedure based at least in part on a collision between one or more sensing signal burst occasions in the plurality of sensing signal burst occasions and a data transmission between a network device and the UE;

determine to suspend the wireless sensing procedure for the one or more sensing signal burst occasions or to reject the data transmission for the one or more sensing signal burst occasions based at least in part on the signaling and on a priority of the wireless sensing procedure; and selectively continuing the wireless sensing procedure or pausing the wireless sensing procedure based at least in part on the determining.

30. An apparatus for wireless communications at a network device, comprising:

at least one processor; and memory coupled with the at least one processor, the memory storing instructions for the at least one processor to cause the network device to:

transmit signaling comprising a request to suspend a wireless sensing procedure based at least in part on a collision between one or more sensing signal burst occasions in a plurality of sensing signal burst occasions and a data transmission between the network device and a user equipment (UE), the wireless sensing procedure comprising radar sensing;

determine whether the UE has suspended the wireless sensing procedure, wherein suspension of the wireless sensing procedure is based at least in part on the signaling and on a priority of the wireless sensing procedure; and communicate with the UE based at least in part on the determination.

* * * * *